(12) United States Patent
Shelton, IV et al.

(10) Patent No.: US 12,484,899 B2
(45) Date of Patent: Dec. 2, 2025

(54) DISTAL TO ARTICULATION MEDICAL STAPLER END EFFECTOR

(71) Applicant: CILAG GMBH INTERNATIONAL, Zug (CH)

(72) Inventors: Frederick E. Shelton, IV, Hillsboro, OH (US); Adam Hensel, Cincinnati, OH (US)

(73) Assignee: CILAG GMBH INTERNATIONAL, Zug (CH)

( * ) Notice: Subject to any disclaimer, the term of this patent is extended or adjusted under 35 U.S.C. 154(b) by 22 days.

(21) Appl. No.: 18/426,480

(22) Filed: Jan. 30, 2024

(65) Prior Publication Data
US 2025/0241644 A1 Jul. 31, 2025

(51) Int. Cl.
A61B 17/072 (2006.01)
A61B 17/00 (2006.01)

(52) U.S. Cl.
CPC ............ A61B 17/07207 (2013.01); *A61B 2017/00473* (2013.01); *A61B 2017/07257* (2013.01); *A61B 2017/07271* (2013.01); *A61B 2017/07278* (2013.01); *A61B 2017/07285* (2013.01)

(58) Field of Classification Search
CPC .... A61B 17/07207; A61B 2017/07257; A61B 2017/07271; A61B 2017/07278; A61B 2017/07285
See application file for complete search history.

(56) References Cited

U.S. PATENT DOCUMENTS

| | | | |
|---|---|---|---|
| 9,833,241 B2 | 12/2017 | Huitema | |
| 9,844,369 B2 | 12/2017 | Huitema | |
| 9,877,721 B2 | 1/2018 | Schellin | |
| 10,010,324 B2 | 7/2018 | Huitema | |
| 11,284,892 B2 | 3/2022 | Beardsley | |
| 2015/0297228 A1 | 10/2015 | Huitema | |
| 2017/0281186 A1 | 10/2017 | Shelton, IV | |
| 2017/0367695 A1 | 12/2017 | Shelton, IV | |
| 2018/0168575 A1 | 6/2018 | Simms | |
| 2018/0168642 A1 | 6/2018 | Shelton, IV | |
| 2019/0015099 A1 | 1/2019 | Cappola | |
| 2021/0401525 A1 | 12/2021 | Beardsley | |
| 2022/0304679 A1* | 9/2022 | Bakos | B33Y 80/00 |
| 2024/0023963 A1 | 1/2024 | Beardsley | |

OTHER PUBLICATIONS

International Search Report and Written Opinion from PCT Application No. PCT/IB2025/051002, dated Jun. 2, 2025.

* cited by examiner

*Primary Examiner* — Michelle Lopez
(74) *Attorney, Agent, or Firm* — Troutman Pepper Locke LLP

(57) ABSTRACT

A medical stapler including a replaceable end effector and a closure and firing assembly. The end effector can include an anvil jaw, a cartridge jaw, and a releasable connector formed at the hinge of the end effector. The cartridge jaw can include a staple cartridge containing therein a plurality of staples, a sled configured to advance the staples from the staple cartridge, and a cutting edge. The closure and firing assembly can be configured to couple to the end effector via an engagement coupling and can include and a drive beam configured to: translate, from outside of the replaceable end effector therethrough thus advancing the sled from the proximal portion to the distal portion. Further, drive beam can retract from the slot to remain with the closure and firing assembly upon disengagement of the releasable connector and the engagement coupling.

20 Claims, 15 Drawing Sheets

DISTAL TO ARTICULATION MEDICAL STAPLER END EFFECTOR

FIELD OF INVENTION

The present disclosure relates to surgical instruments and, in various arrangements, to surgical stapling and cutting instruments and end effectors for use therein that are designed to staple and cut tissue.

BACKGROUND

Many medical staplers are "single patient use" devices, and as such they require balancing performance, namely stapling and cutting performance, with ease of use and affordability. Staple cartridges and/or end effectors can be "single use" meaning that they are discarded once the staples are fired. Generally, it is more expensive to make a more robust end effector, and, conversely, cheaper end effectors are generally less robust. Optimizing stapler performance and ease of use with reduced cost remains a technical challenge.

Typically, medical staplers have either replaceable single use staple cartridges or entirely replaceable single use end effectors. Replaceable staple cartridges can allow the other components of the end effector-such as the mechanism which drives the staples and knife—to be made more robust. While this can provide better stapler performance, it requires the replacement of the staple cartridge, and the reusable knife can become progressively duller with successive uses. Entirely replaceable end effectors are typically less robust and may not be capable of applying as much clamping force as their reusable counterparts, but they can be easier to swap between uses and can provide a fresh cutting edge for each stapling/cutting action.

Thus, there is a need for an improved medical stapler and end effector combination that can provide better stapling performance, reduced cost, and improved ease of use.

SUMMARY

It is an object of the present disclosure to provide devices and methods to meet the above-stated needs. The systems, devices, and methods relate to staplers used in minimally invasive surgeries.

The instant disclosure describes a medical stapler. The medical stapler can include a replaceable end effector including an anvil jaw extending from a proximal portion to a distal portion, a cartridge jaw extending from a proximal portion to a distal portion, a hinged connection coupling the proximal portion of the anvil jaw to the proximal portion of the cartridge jaw, and a releasable connector formed at a proximal end of the replaceable end effector. The cartridge jaw can include a bearing surface and a staple cartridge disposed in the cartridge jaw, a slot extending from the bearing surface toward the staple cartridge. The staple cartridge can contain therein a plurality of staples, a sled configured to advance at least a portion of the plurality of staples from the staple cartridge, and a cutting edge. The medical stapler can further include a closure and firing assembly. The closure and firing assembly can include a reusable shaft extending along a longitudinal axis and configured to couple to the releasable connector of the replaceable end effector, an engagement coupling configured to releasably engage the releasable connector of the replaceable end effector, and a drive beam. The drive beam can be configured to translate, from outside of the slot of the replaceable end effector, through the slot and across the bearing surface thus advancing the sled from the proximal portion to the distal portion. Further, the drive beam can retract from the slot to remain with the closure and firing assembly upon disengagement of the releasable connector and the engagement coupling. The cutting edge can be configured to remain in the replaceable end effector upon the disengagement of the releasable connector and the engagement coupling.

The instant disclosure describes a replaceable end effector. Replaceable end effector can include an anvil jaw extending from a proximal portion to a distal portion, a cartridge jaw extending from a proximal portion to a distal portion, a hinged connection coupling the proximal portion of the anvil jaw to the proximal portion of the cartridge jaw, and a releasable connector formed at a proximal end of the replaceable end effector and configured to couple the replaceable end effector to a reusable shaft of a medical stapler handle assembly. The cartridge jaw can include a bearing surface, a staple cartridge permanently disposed in the cartridge jaw and including a plurality of staples therein, a sled, and a slot extending from the bearing surface toward the staple cartridge and having a proximal opening into which a drive beam can slide. The sled can include a wedge disposed on a distal end of the sled and configured to advance at least a portion of the plurality of staples from the staple cartridge and a cutting edge.

The instant disclosure describes a method of stapling tissue using a medical stapler. The method can include the steps of attaching a replaceable end effector to a handle assembly of the medical stapler, placing a target tissue between a cartridge jaw and an anvil jaw of a medical stapler, clamping the target tissue between the cartridge jaw and the anvil jaw, translating a closure tube distally toward a taper on the anvil jaw, and driving a drive beam longitudinally into the cartridge jaw and the anvil jaw.

The instant disclosure describes a reusable handle for a medical stapler. The handle can include a reusable shaft extending along a longitudinal axis from a proximal end to a distal end and configured to couple to a replaceable end effector, a handle assembly permanently coupled to the proximal end of the reusable shaft, an engagement coupling configured to releasably engage the replaceable end effector, and a drive beam configured to advance into and retract out of the replaceable end effector.

DETAILED DESCRIPTION

Figure 1:
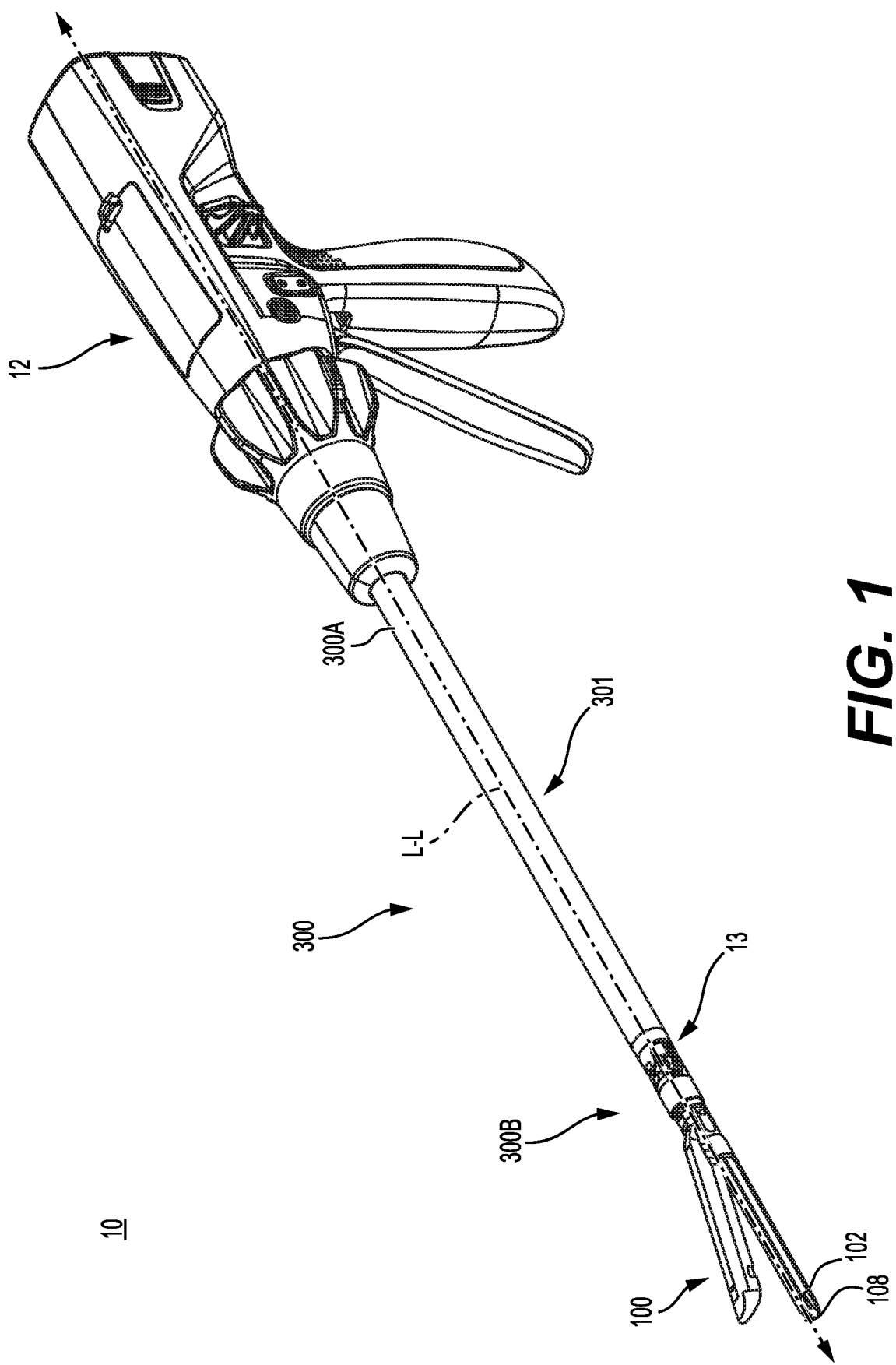
FIG. 1 shows a medical stapler, according to aspects of the present disclosure.

The disclosed technology relates to improving the performance and ease of use of medical staplers. A medical stapler with a replaceable end effector compatible with a highly robust drive beam, such as that described in various examples herein, achieves this in part by virtue of the coupling mechanism and driving mechanism allowing for a robust drive beam, fresh cutting edge for each single use, and mechanical simplicity.

The following detailed description should be read with reference to the drawings, in which like elements in different drawings are identically numbered. The drawings, which are not necessarily to scale, depict selected embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention.

Numerous specific details are set forth to provide a thorough understanding of the overall structure, function, manufacture, and use of the embodiments as described in the specification and illustrated in the accompanying drawings. Well-known operations, components, and elements have not been described in detail so as not to obscure the embodiments described in the specification. The reader will understand that the embodiments described and illustrated herein are non-limiting examples, and thus it can be appreciated that the specific structural and functional details disclosed herein may be representative and illustrative. Variations and changes thereto may be made without departing from the scope of the claims.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a surgical system, device, or apparatus that "comprises," "has," "includes" or "contains" one or more elements possesses those one or more elements but is not limited to possessing only those one or more elements. Likewise, an element of a system, device, or apparatus that "comprises," "has," "includes" or "contains" one or more features possesses those one or more features but is not limited to possessing only those one or more features.

As used herein, the terms "patient," "host," "user," and "subject" refer to any human or animal subject and are not intended to limit the systems or methods to human use, although use of the subject invention in a human patient represents a preferred example. It should be appreciated that an animal can be a variety of any applicable type, including, but not limited thereto, mammal, veterinarian animal, livestock animal or pet type animal, etc. As an example, the animal can be a laboratory animal specifically selected to have certain characteristics similar to a human (e.g., rat, dog, pig, monkey, or the like). It should be appreciated that the subject can be any applicable human patient, for example. As well, the term "proximal" indicates a location closer to the operator or physician whereas "distal" indicates a location further away to the operator or physician.

As discussed herein, "physician" can include a doctor, surgeon, technician, scientist, operator or any other individual or delivery instrumentation associated with performing a medical operation on a subject.

Furthermore, the use of "couple", "coupled", "attach", "attached", or similar phrases should not be construed as being limited to a certain number of components or a particular order of components unless the context clearly dictates otherwise.

Various exemplary devices and methods are provided for performing laparoscopic and minimally invasive surgical procedures. However, the reader will readily appreciate that the various methods and devices disclosed herein can be used in numerous surgical procedures and applications including, for example, in connection with open surgical procedures. As the present Detailed Description proceeds, the reader will further appreciate that the various instruments disclosed herein can be inserted into a body in any way, such as through a natural orifice, through an incision or puncture hole formed in tissue, etc. The working portions or end effector portions of the instruments can be inserted directly into a patient's body or can be inserted through an access device that has a working channel through which the end effector and an elongate shaft of a surgical instrument can be advanced.

Figure 7:
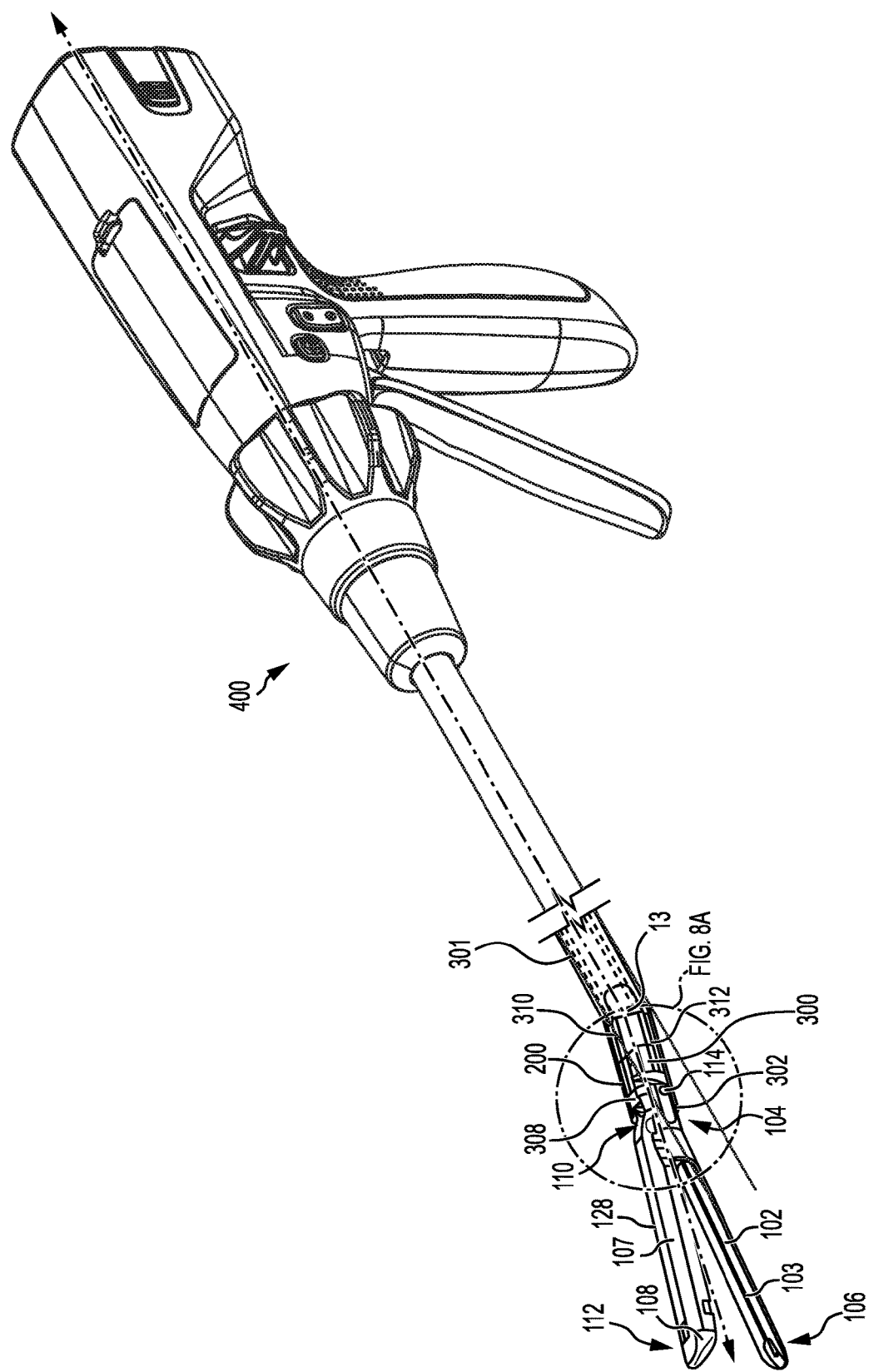
FIG. 7 shows a medical stapler, according to aspects of the present disclosure.

A medical stapler 10 is illustrated in FIG. 1. The medical stapler 10 is configured to grasp, clamp, incise, and seal patient tissue and has a replaceable end effector 100. The medical stapler 10 includes a handle assembly 12 and a closure and firing assembly 300 configured to couple to end effector 100 so that the medical stapler 10 can perform a stapling and cutting sequence. To achieve the goals of improved stapling and cutting performance, reduced manufacturing cost and complexity, and simplified use, the replaceable end effector 100 attaches to the handle assembly 12 distal to an articulation joint 13 between shaft portion 300A and shaft portion 300B. FIG. 7 shows the stapler 10 of FIG. 1 with the shaft 301 articulated at said articulation joint 13. In contrast to existing disposable medical stapler end effectors that include an articulation joint and drive beam, the present end effector 100 attaches to closure and firing assembly 300 distal to an articulation joint 13 which allows for the articulation and firing mechanisms to be made more robust without sacrificing economy because they can be reused for multiple firings. When the articulation joint and drive beam must be discarded after a single firing, either robustness or economy, or both, may be sacrificed.

Stated otherwise, medical stapler 10 is formed from a reusable handle 12 and replaceable end effector 100. The medical stapler 10 can include handle assembly 12 and closure and firing assembly 300. Closure and firing assembly 300 can refer generally to components of medical stapler 10 that induce the end effector 100 to close, clamp, release, fire, and/or articulate; each component of closure and firing assembly 300 can contribute in whole or in part to either closure or firing, or both.

Figure 2A:
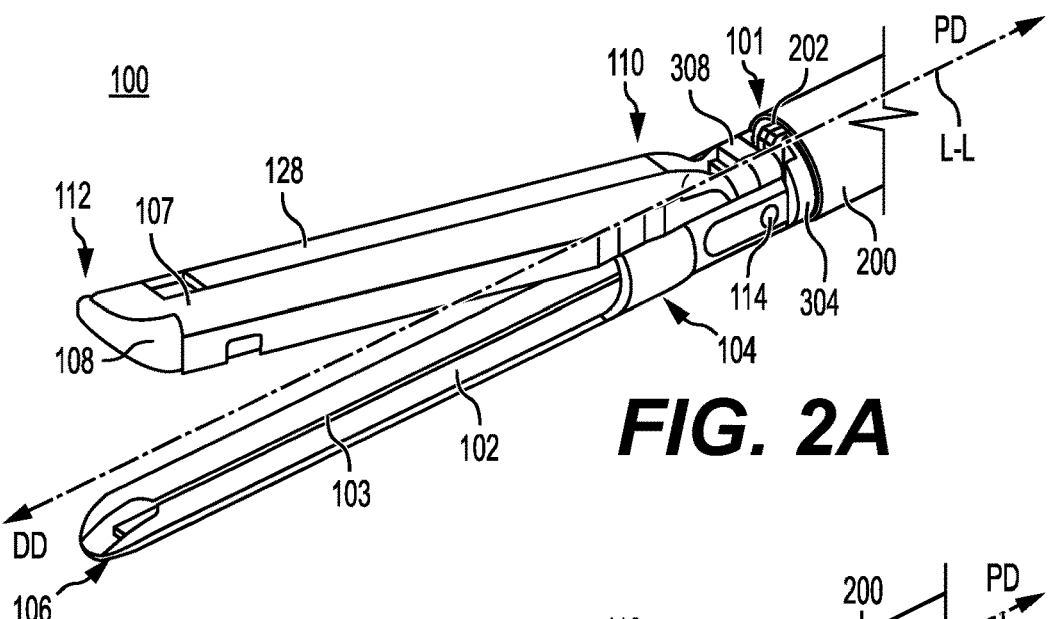
FIG. 2A shows a perspective view of a medical stapler end effector, according to aspects of the present disclosure.
Figure 2B:
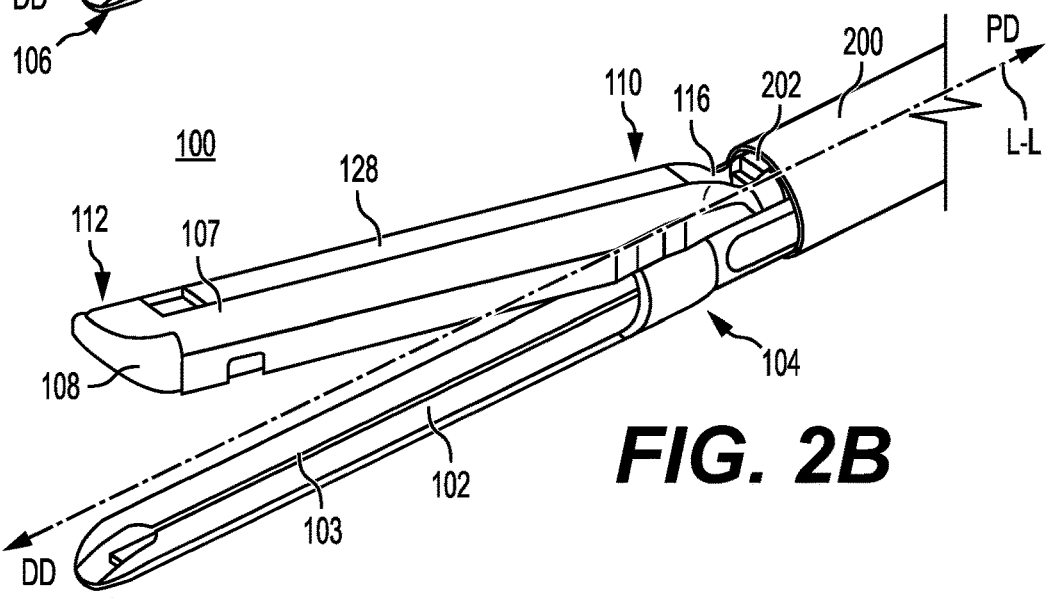
FIG. 2B shows a perspective view of a medical stapler end effector, according to aspects of the present disclosure.
Figure 2C:
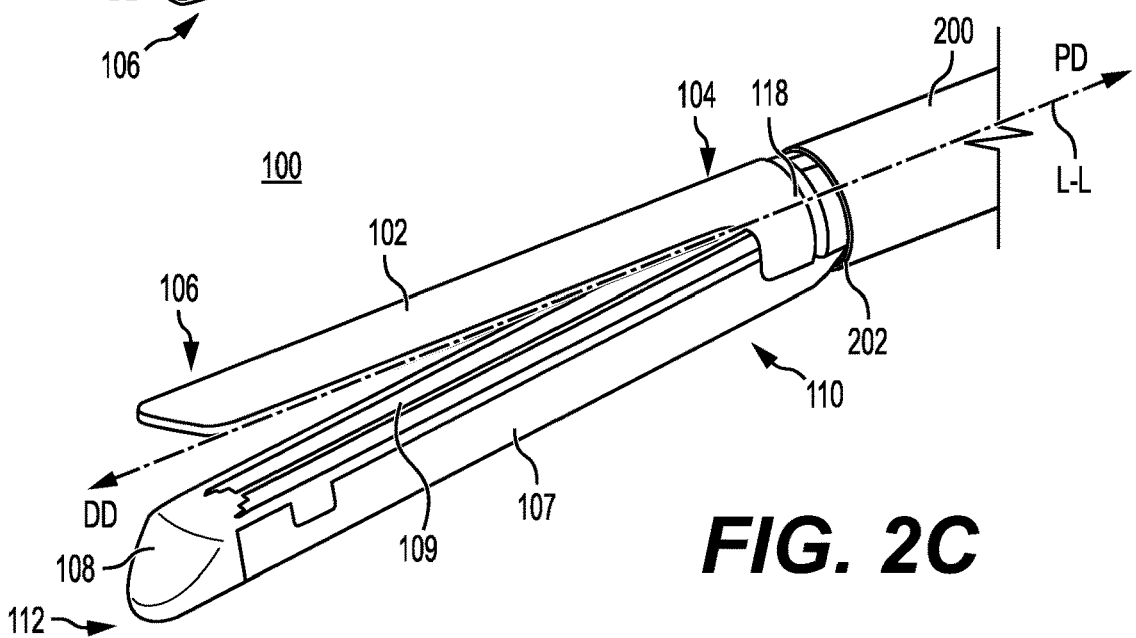
FIG. 2C shows a perspective view of a medical stapler end effector, according to aspects of the present disclosure.
Figure 3:
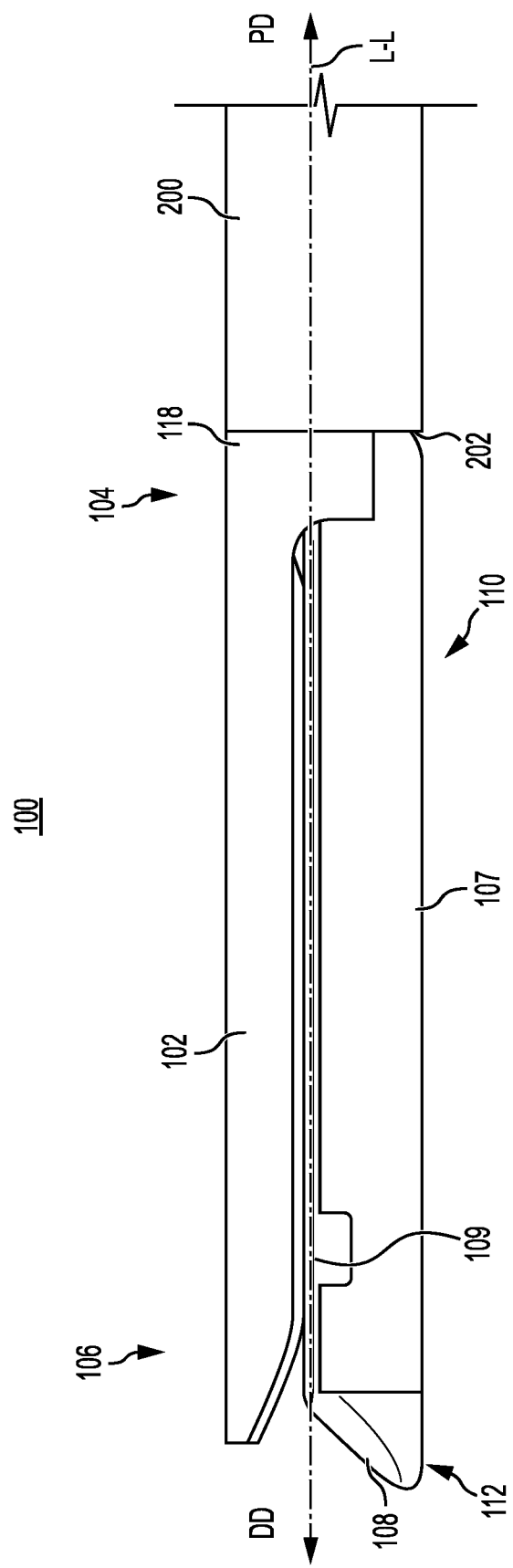
FIG. 3 shows a side view of a medical stapler end effector in the clamped position, according to aspects of the present disclosure.

FIGS. 2A-3 show the replaceable end effector 100 coupled to the shaft 301, though shaft 301 is concealed within closure tube 200. The replaceable end effector 100 includes an anvil jaw 102 extending from a proximal portion 104 to a distal portion 106, a cartridge jaw 107 extending from a proximal portion 110 to a distal portion 112, a hinged connection 114 coupling the proximal portion 104 of the anvil jaw 102 to the proximal portion 110 of the cartridge jaw 107, and a releasable connector 111 formed at a proximal end 101 of the replaceable end effector 100. As used herein and as indicated on FIG. 2A, FIG. 4B, and FIG. 5C, the proximal end 101 of the end effector 100 can be an integral part of anvil jaw 102. Alternatively, proximal end 101 could be an integral part of cartridge jaw 107. In some examples, proximal end 101 can be collocated with releasable connector 111. Anvil jaw 102 can include a channel 103 through which a drive beam 308 and/or cutting edge 119 can travel, shown and discussed in greater detail in relation to FIG. 4B and FIG. 8B. Medical stapler 10 can include a closure tube 200 coaxial with the longitudinal axis L-L and disposed partially around shaft 301. Closure tube 200 can serve to hold the end effector 100 to the closure and firing assembly 300, and in some implementations can apply clamping pressure to the end effector 100 via impingement upon the jaws 102, 107, as discussed in detail below. In some examples, closure tube 200 can provide some or all clamping pressure. Closure tube 200 is movable longitudinally along the longitudinal axis L-L responsive to user input.

While described throughout as being used in conjunction with a medical stapler including a handle 12, end effector 100 can be used with other modes of implementation, such as surgical robots, without departing from the scope of this disclosure.

Clamping, incising, and sealing the tissue involves closing the anvil jaw 102 and the cartridge jaw 107 from the open position shown in FIG. 2A to the closed clamped position in FIG. 3. FIG. 2A shows end effector 100 coupled to shaft 301 via engagement coupling 304 with the jaws 102, 107 open, the closure tube 200 retracted, and the drive beam 308 disposed proximate the proximal portion 110 of the cartridge jaw 107. Note that in FIG. 2A the closure tube is retracted all the way proximally to removal position 200C (shown in FIG. 5C). In FIG. 2B, the drive beam 308 has partially advanced into the end effector 100 and has only just begun to close the jaws 102, 107 by virtue of the drive beam 308 sliding along a sloped surface 116 disposed on the proximal portion 110 of the cartridge jaw 107. Sloped surface 116 is configured to engage with the drive beam 308 to effect closure of the end effector 100 as the drive beam 308 translates along sloped surface 116. In the configuration shown in FIG. 2B, the end effector 100 is fully engaged on the closure and firing assembly 300 and the closure tube 200 is advanced over the engagement coupling 304 to proximal position 200A (shown in FIG. 5A), thereby preventing the releasable connector 111 from disengaging the engagement coupling 304. FIG. 2C shows state of closure of end effector 100 similar to that shown in FIG. 2B in that the end effector 100 is coupled to the shaft 301 and the jaws 102, 107 are only slightly closed, but in this example the closure tube 200 is advanced slightly in the distal direction D-D such that the distal end 202 of the closure tube 200 is advanced to distal position 200C (shown in FIG. 5B) and impinges on the end effector 100 thus creating a pre-clamping force. Sloped surface 116 can in some examples be configured to engage the closure tube 200 to supply additional clamping or pre-clamping force. The proximal portion 104 of the anvil jaw 102 can further include a taper 118 configured to engage the distal end 202 of closure tube 200 when the closure tube is in the distal position 200B (shown in FIG. 5B) so that distal advancement of the closure tube 200 adds clamping pressure via the anvil jaw 102 as well as the cartridge jaw 107.

FIG. 3 shows a completely clamped end effector 100. In this example, closure tube 200 is advanced such that distal end 202 is pressed against both the anvil jaw 102 and the cartridge jaw 107.

Figure 4A:
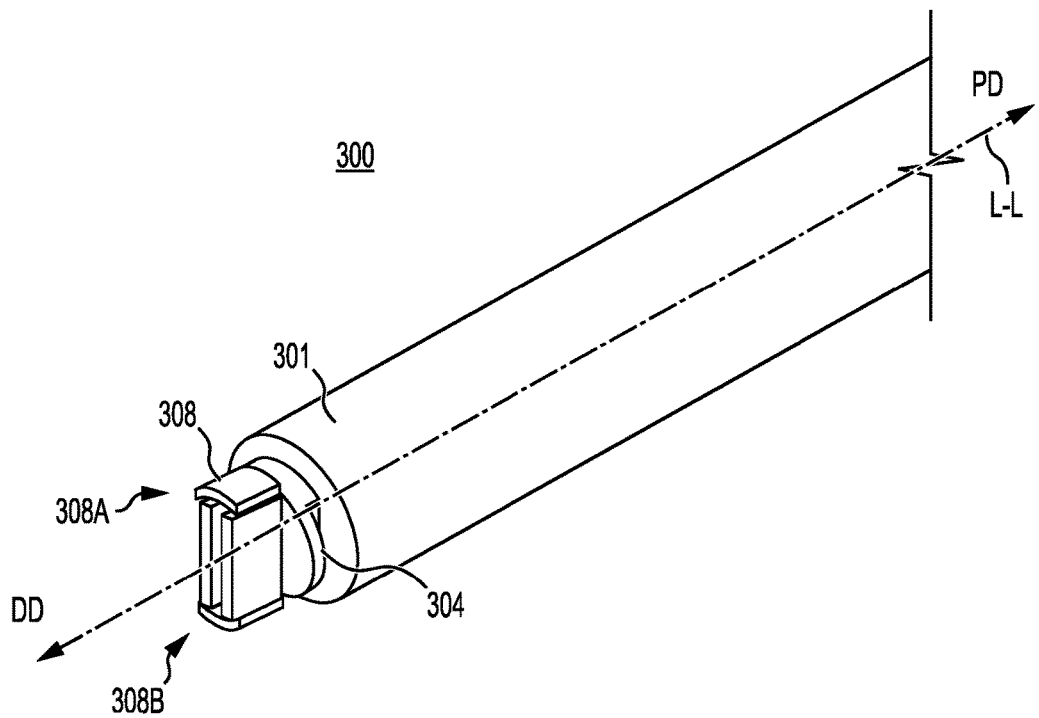
FIG. 4A shows perspective view of a closure and firing assembly of a medical stapler, according to aspects of the present disclosure.

FIG. 4A shows a portion of closure and firing assembly 300. Closure and firing assembly 300 can include reusable shaft 301 extending along a longitudinal axis L-L and configured to couple to the releasable connector 111 via an engagement coupling 304. Shaft 301 can be sized to fit within closure tube 200. Engagement coupling 304 releasably engages the releasable connector 111 of the replaceable end effector 100, for example in a tongue-and-groove type engagement. It should be noted that while in the example shown in FIG. 4A and throughout the figures the engagement coupling 304 is shown as the "tongue" portion of the tongue-and-groove engagement, and in the example shown in FIG. 4B the releasable connector 111 is shown as a coupling slot 111A, or the "groove" portion, formed in the proximal portion 104 of the anvil jaw 102, other examples could reverse the "tongue" and "groove" such that the engagement coupling 304 is the "groove" and the releasable connector 111 is the "tongue". As used herein, without limiting the scope of this disclosure and for simplicity alone, the term "tongue 304" may be used interchangeably with the term "engagement coupling 304". Likewise, the term "groove 111" may be used interchangeably with the term "releasable connector 111". The coupling slot 111A can in some examples be formed from a metal stamping process, and this structure can be seen in greater detail in the view shown in FIG. 5C. As will be discussed in more detail below, closure tube 200 can constrain the tongue-and-groove engagement such that the engagement coupling 304 cannot come out of slot 111A when the closure tube 200 is advanced over the tongue-and-groove engagement. These types of engagement between closure and firing assembly 300 and end effector 100 provides numerous advantages. For example, the tongue-and-groove engagement is mechanically simpler than some other modes of coupling which involve latches, locks, or the like. Additionally, the coupling slot 111A can be formed from a metal stamping process rather than a comparatively more expensive machining process. Furthermore, replacing the end effector 100 can be as simple as sliding the tongue out of the groove.

Returning to FIG. 4A, drive beam 308 of closure and firing assembly 300 can be configured to (i) translate from outside of the slot 109 (see slot in FIG. 5A), through the slot 109, and across a bearing surface 105, thus advancing a staple pushing sled 117 from the proximal portion 110 to the distal portion 112, and (ii) retract from the slot 109 to remain with the closure and firing assembly 300 upon disengagement of the releasable connector 111 and the engagement coupling 304. Sled 117 is shown in more detail in FIG. 10B. This allows for a robust multi-use drive beam 308 to be used in conjunction with replaceable end effector 100. Drive beam 308 can be an I-beam, which has the advantage of robust force transmission via linear translation through the end effector.

Figure 4B:
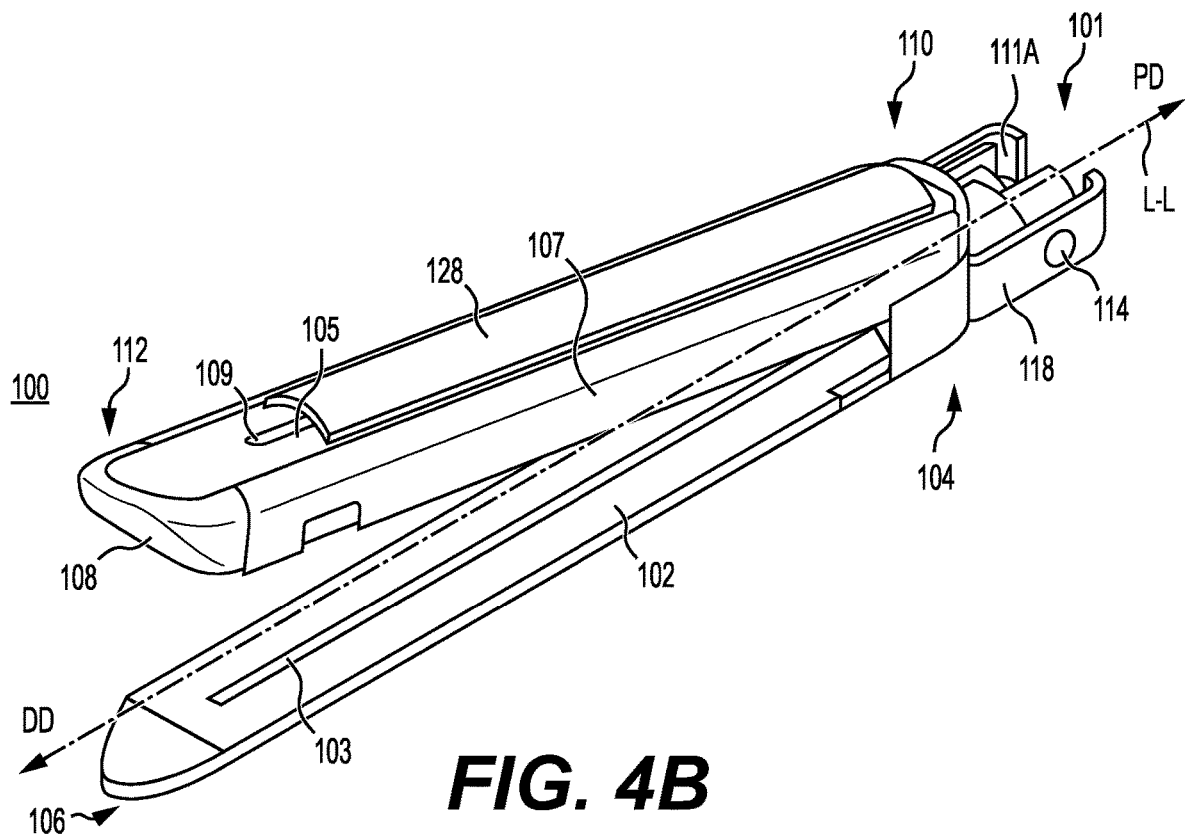
FIG. 4B shows perspective view of a replaceable end effector for a medical stapler, according to aspects of the present disclosure.

FIG. 4B shows the replaceable end effector 100. The cartridge jaw 107 of replaceable end effector can include a staple cartridge 108 disposed in the cartridge jaw 107. The staple cartridge 108 can be disposed permanently in the cartridge jaw 107. That is to say, the staple cartridge 108 can be an integral part of the cartridge jaw 107 which cannot be removed by a user without destroying the end effector 100 for its purpose. Many medical staplers, such as those described above in the Background section of this disclosure, have staple cartridges which are readily replaced into a reusable end effector to allow for a subsequent firing of the stapler. By contrast, the entire end effector 100 described herein is intended to be replaced, rather than merely removing, discarding, and replacing the staple cartridge. This has the advantage of enabling the user to reload a set of staples and thus perform subsequent firings of the stapler 10 more quickly. Additionally, a new end effector 100 can provide a fresh cutting edge 119 which is not yet dulled by having previously cut through tissue. Cartridge jaw 107 can further include a cover 128 disposed parallel to bearing surface 105 and forming a top surface of the slot 109.

Figure 5A:
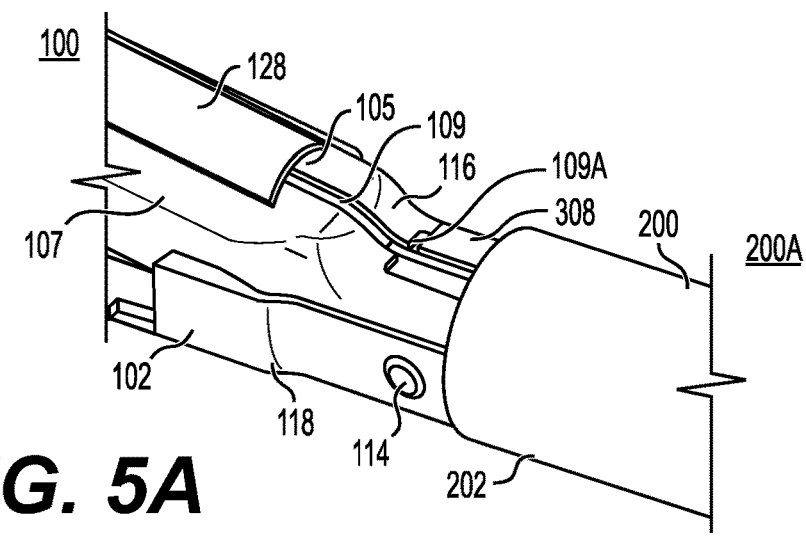
FIG. 5A shows a perspective view of a replaceable end effector and a retracted closure tube of a medical stapler, according to aspects of the present disclosure.
Figure 5B:
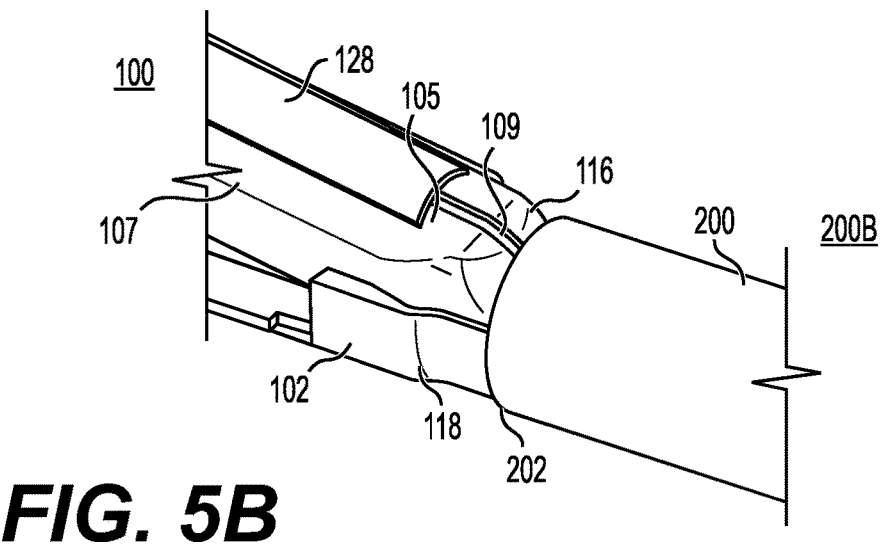
FIG. 5B shows a perspective view of a replaceable end effector and an advanced closure tube of a medical stapler, according to aspects of the present disclosure.
Figure 5C:
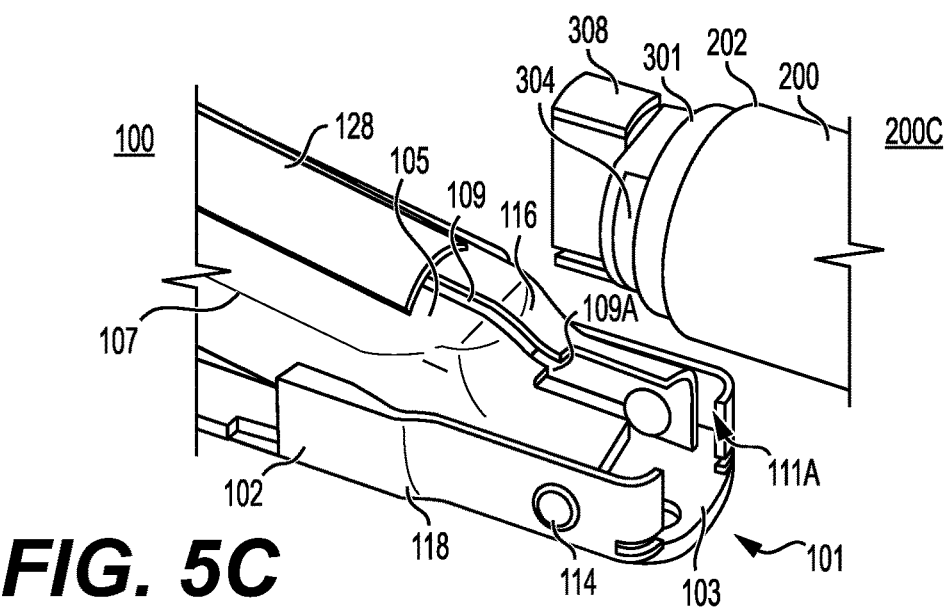
FIG. 5C shows a perspective view of a replaceable end effector disconnected from a closure and firing assembly of a medical stapler, according to aspects of the present disclosure.

FIGS. 5A-5C show the closure tube 200 in various longitudinal positions. FIG. 5A shows the end effector 100 engaged with the closure and firing assembly 300. The cartridge jaw 107 can include a slot 109 extending from the bearing surface 105 toward the longitudinal axis L-L and forming a path through which drive beam 308 and cutting edge 119 can travel. Slot 109 can have a proximal opening 109A to receive the drive beam 308 as drive beam 308 proceeds distally. The drive beam 308 is advanced partially into slot 109, and the distal end 202 of closure tube 200 is retracted into proximal position 200A. In proximal position 200A, the distal end 202 of closure tube 200 is not yet sliding along sloped surface 116. Thus, closure tube 200 is not yet applying any clamping force on the end effector 100 but rather simply enclosing the hinged connection 114. In some examples, releasable connector 111 can be configured to be constrained by the closure tube 200 when the closure tube 200 is in the proximal position 200A but otherwise free to slide out of engagement coupling 304.

FIG. 5B shows the closure tube 200 in distal position 200B wherein the closure tube 200 applies a clamping force to the replaceable end effector 100, namely via sliding along sloped surface 116 and forcing the jaw 107 closed. Alternatively, or additionally, in the distal position 200B the distal end 202 can engage with the anvil jaw 102 proximate the proximal portion 104 thus pivoting the anvil jaw 102 toward the cartridge jaw 107. FIG. 5C, the closure tube 200 is moved proximally past the proximal position 200A to a removal position 200C in which the closure tube 200 is sufficiently retracted to permit release of the replaceable end effector 100.

Figure 6A:
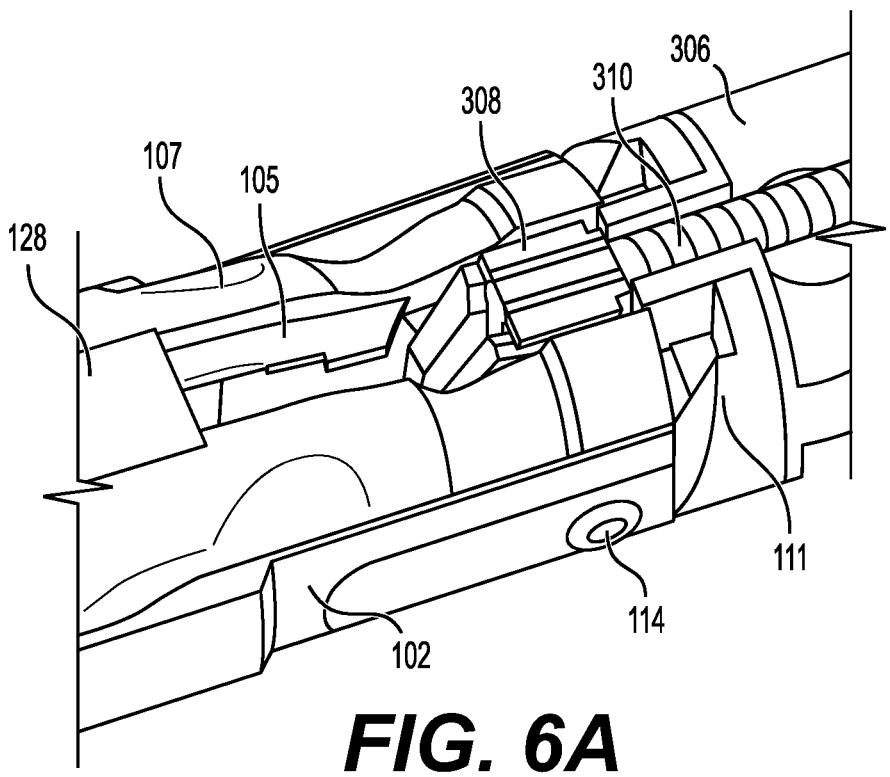
FIG. 6A shows a detail view of an engagement coupling in a state of engagement with a releasable connector of a medical stapler, according to aspects of the present disclosure.
Figure 6B:
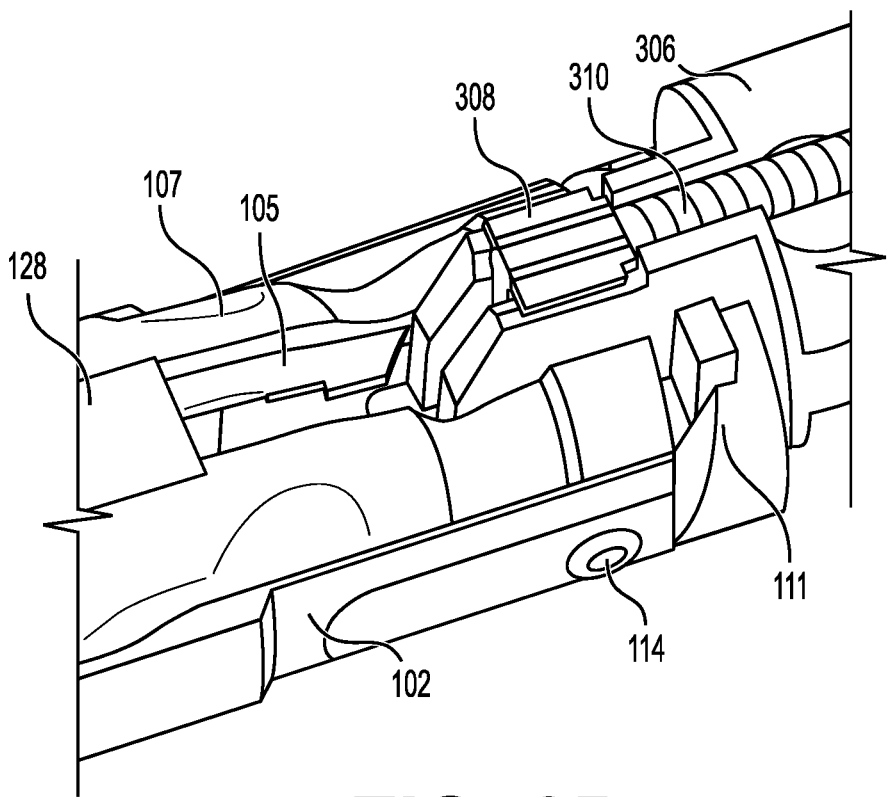
FIG. 6B shows a detail view of an engagement coupling in between a state of engagement and disengagement with a releasable connector of a medical stapler, according to aspects of the present disclosure.
Figure 6C:
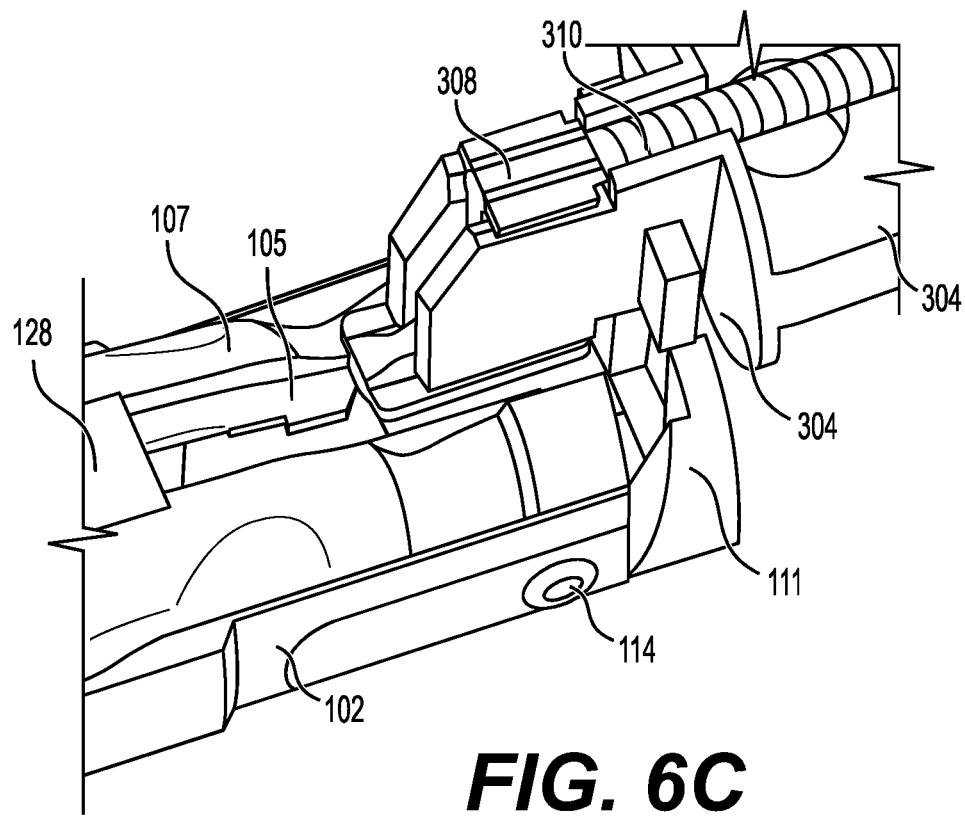
FIG. 6C shows a detail view of an engagement coupling in a state of disengagement from a releasable connector of a medical stapler, according to aspects of the present disclosure.
Figure 6D:
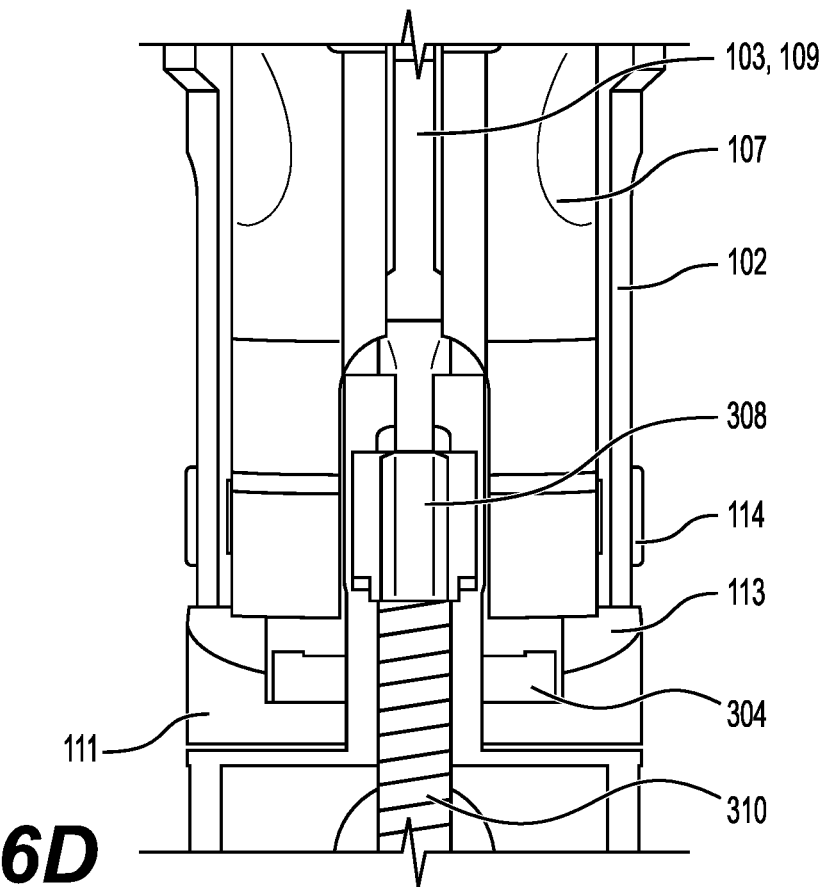
FIG. 6D shows a detail top view of an engagement coupling and a releasable connector of a medical stapler, according to aspects of the present disclosure.

FIGS. 6A-6D show various states of engagement and disengagement between end effector 100 and closure and firing assembly 300. FIG. 6A and FIG. 6D show the engagement coupling 304 fully engaged with the releasable connector 111. In other words, the "tongue" 304 is fully slotted into the "groove" 111. FIG. 6B shows an intermediate state of engagement between end effector 100 and closure and firing assembly 300. Without being constrained by closure tube 200, in some examples the "tongue" 304 is free to slide out of the "groove" 111. In other examples, the engagement can also be constrained by latches, locks, detents, or the like, especially those capable of being formed in stamped metal. FIG. 6C shows the end effector 100 completely disengaged from the closure and firing assembly 300. FIG. 6D shows an example in which releasable connector 111 further includes a slanted face 113 configured to detach the replaceable end effector 100 from the reusable shaft 301 upon longitudinal translation of the replaceable end effector 100 relative to the medical stapler handle assembly 12.

Figure 8A:
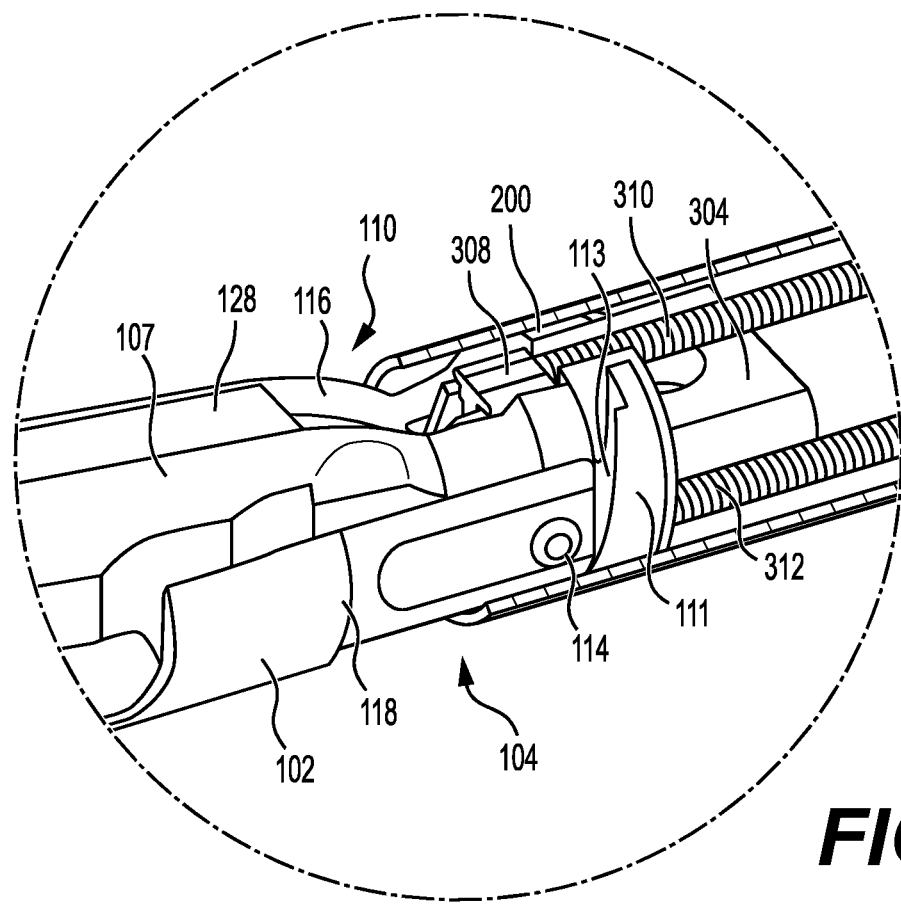
FIG. 8A shows a detail view of the coupling portion of the medical stapler of FIG. 7.

FIG. 7 shows stapler 10 with the shaft 301 angled at an articulation joint 13 such that the end effector 100 is not parallel to the longitudinal axis L-L. FIG. 8A shows a detailed view of the portion of the stapler 10 as indicated in FIG. 7. In this view, portions of the closure and firing assembly 300 are cutaway such that a first flexible driveshaft 310 a second flexible driveshaft 312 can be seen. Flexible driveshafts 310, 312 can be formed from coils or otherwise from flexible materials as will be appreciated by those skilled in the pertinent art. In the examples contemplated herein, driveshafts 310, 312 push and pull on the drive beam 308 rather than rotating therethrough to advance said drive beam 308 via along threads. The first flexible driveshaft 310 is coupled to the drive beam 308 at a first side 308A of the drive beam 308, and the second flexible driveshaft 312 is coupled to the drive beam 308 at a second side 308B, opposite the first side 308A. The first flexible driveshaft 310 and the second flexible driveshaft 312 are configured to apply differential force to the drive beam 308. In some examples as shown in FIG. 7, the closure and firing assembly 300 can include at least one motor 402 configured to differentially drive the first flexible driveshaft 310 and the second flexible driveshaft 312 to apply said differential force to the drive beam 308. At least one sensor can be configured to detect a first force applied on the drive beam 308 by the first flexible driveshaft 310 and a second force applied on the drive beam 308 by the second flexible driveshaft 312. There can also be provided processing circuitry configured to modulate the forces to be applied on the drive beam 308 by the first flexible driveshaft 310 and the second flexible driveshaft 312 using the forces detected by the at least one sensor as inputs. In contrast to the example end effector 100 shown in FIG. 4B, in that shown in FIG. 8A the cover 128 is recessed into the cartridge jaw 107.

Figure 8B:
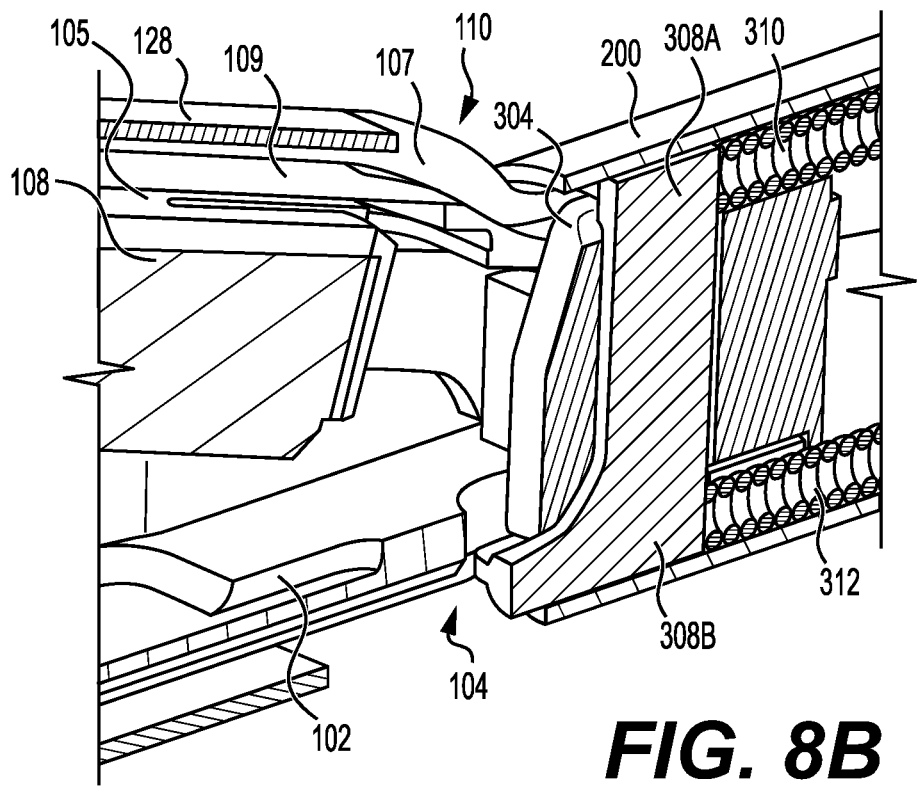
FIG. 8B shows section view of the coupling portion of the medical stapler of FIG. 8A.

FIG. 8B shows a section view of the union between end effector 100 and closure and firing assembly 300. Drive beam 308 has advanced partially through engagement coupling 304, and closure tube 200 is advanced distally partially over jaws 102, 107 of end effector 100. In this view, it can be seen that bearing surface 105 in the end effector 100 is beneath the cover 128 and the drive beam 308 can be completely insulated from the ambient environment. The components of end effector 100 are shown in more detail in FIGS. 9A-10.

Figure 9A:
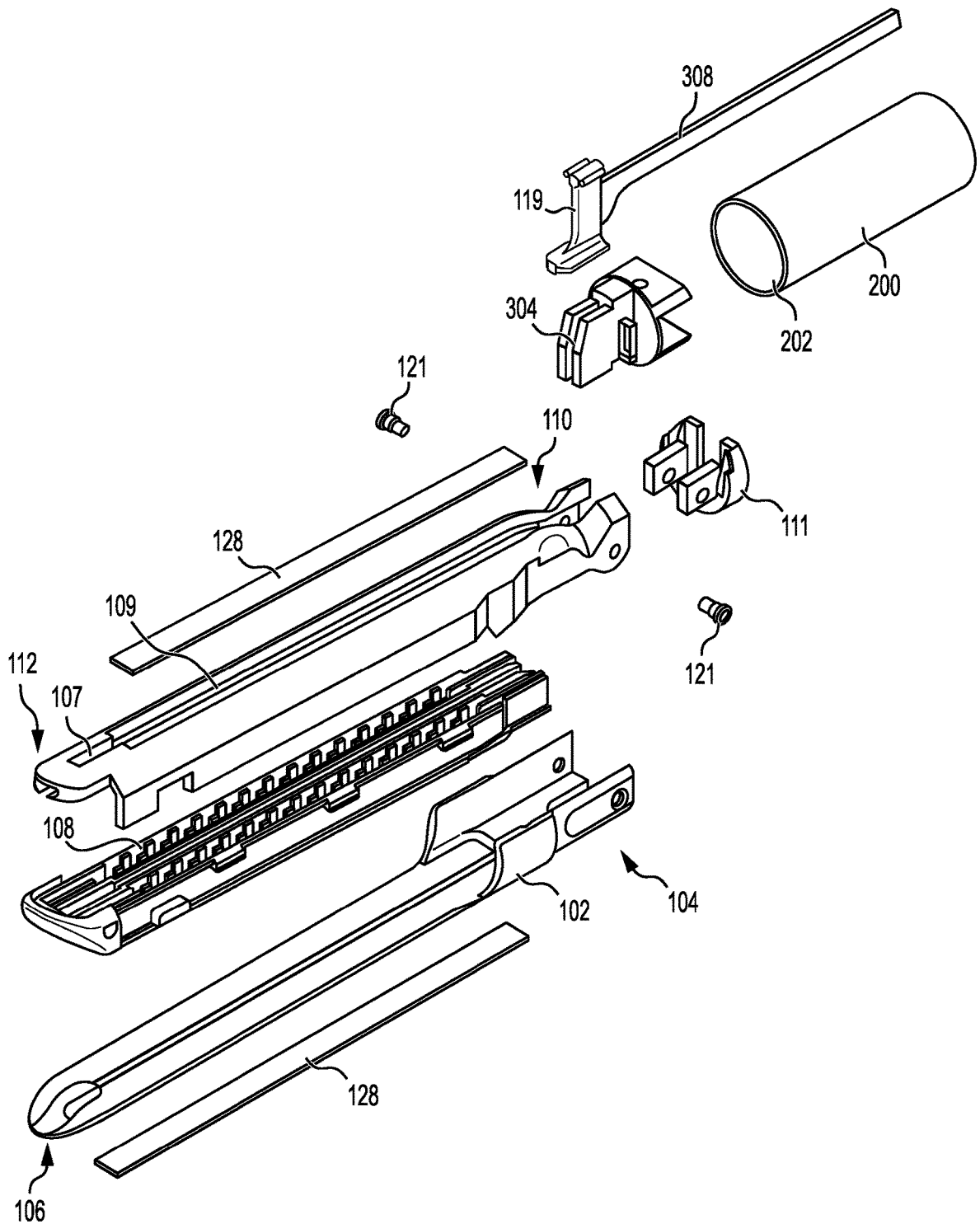
FIG. 9A shows an exploded view of a replaceable end effector and portions of a closure and firing assembly for a medical stapler, according to aspects of the present disclosure.

FIG. 9A shows an exploded view of replaceable end effector 100. In this example, engagement coupling 304 is configured to allow rotation of the end effector 100 about the longitudinal axis L-L and pivoting of the end effector at proximal end 101. Fasteners 121 hold the anvil jaw 102 together the cartridge jaw 107 and the releasable connector 111 and form the hinged connection 114 of end effector 100. The staple cartridge 108 can include therein a plurality of staples. Said staples can be pushed out of the staple cartridge 108 and into tissue clamped between jaws 102, 107 to accomplish the tissue sealing operation. Optionally, the drive beam 308 can push on a sled 117 configured to advance at least a portion of the plurality of staples from the staple cartridge 108. In some examples, a cutting edge similar to cutting edge 119 can be provided on the sled 117 rather than on the drive beam 308. Cutting edge 119 can be configured to remain in the replaceable end effector 100 upon the disengagement of the releasable connector 111 and the engagement coupling 304. For example, cutting edge 119 can be disposed on the sled 117 rather than in the drive beam. Cutting edge 119 can also be disposed on a separate component disposed between the sled 117 and the drive beam 308. This provides the advantage of a fresh cutting edge 119 for each cutting operation since the sled 117 can be configured to remain within the replaceable end effector 100.

Figure 9B:
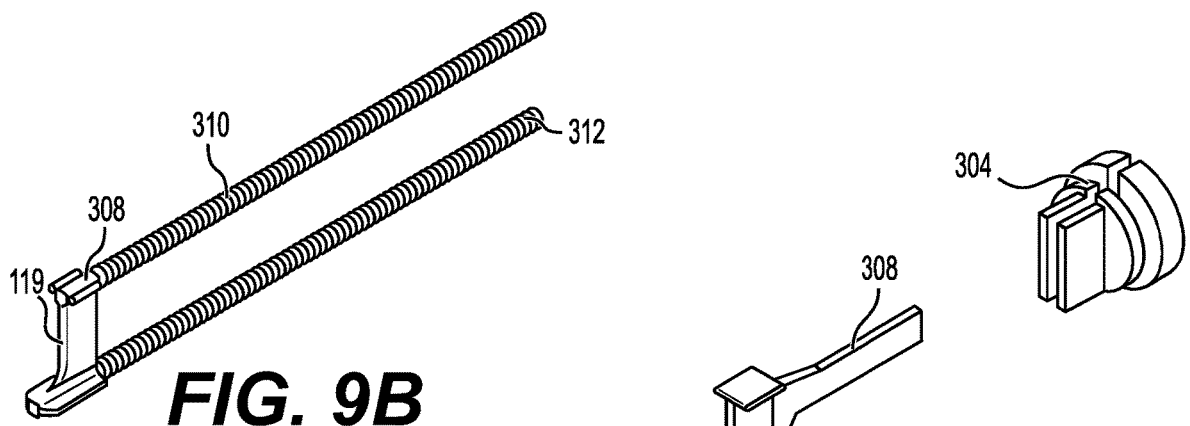
FIG. 9B shows a perspective view of a drive beam and drive shafts of a medical stapler, according to aspects of the present disclosure.

In the example shown in FIG. 9A, drive beam 308 does not have attached to it two separate coiled driveshafts 310, 312 but rather one integral shaft which is part of drive beam. The integral shaft of drive beam 308 can include a laminated beam that enables the drive beam 308 to be flexible (e.g., to flex at the articulation joint 13) while also supporting the axial drive motions described herein. FIG. 9B shows a drive beam 308 with coupled driveshafts 310, 312 which could be substituted for the drive beam 308 shown in FIG. 9A. Coiled driveshafts 310, 312 are able to flex to accommodate articulation of the shaft at articulation joint 13. In FIGS. 9A-9B, the cutting edge 119 is formed on drive beam 308.

Figure 10A:
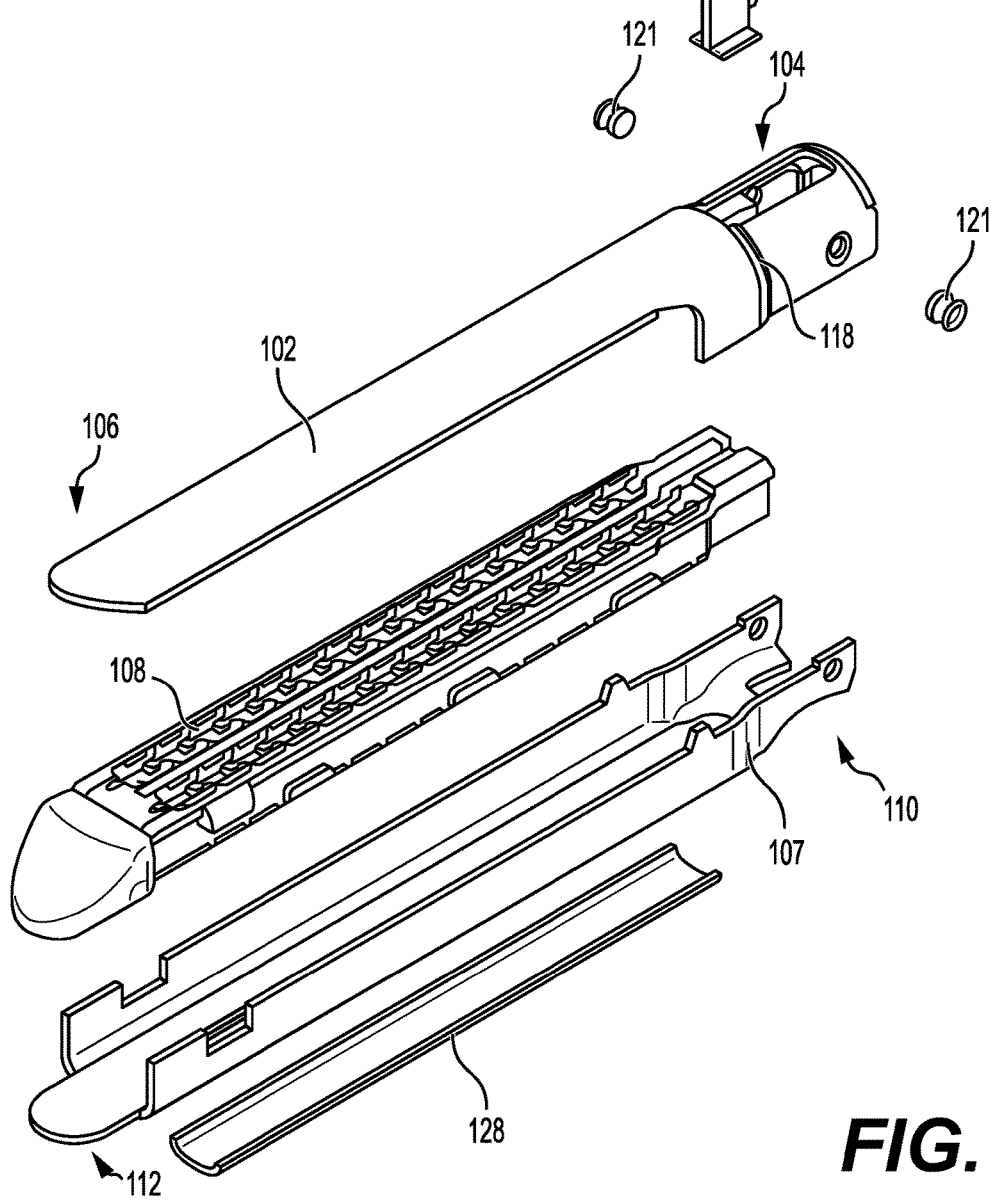
FIG. 10A shows an exploded view of a replaceable end effector and portions of a closure and firing assembly for a medical stapler, according to aspects of the present disclosure.
Figure 10B:
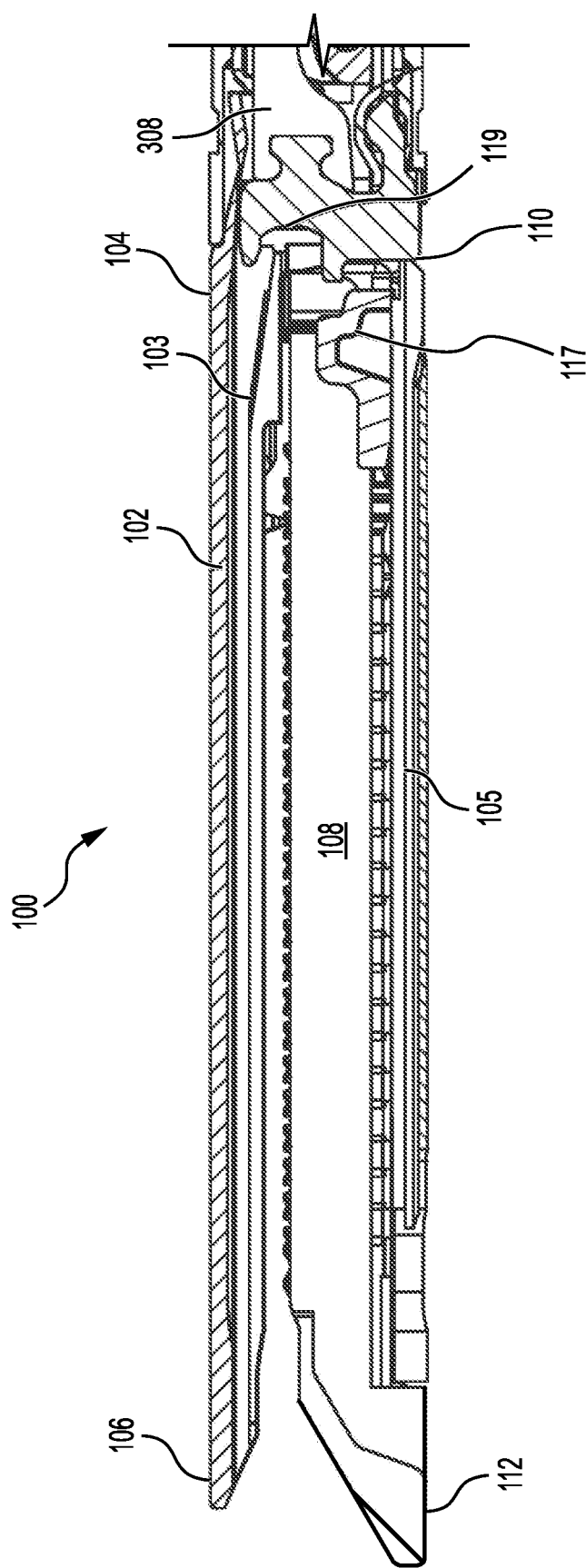
FIG. 10B shows a cross section of a replaceable end effector, according to aspects of the present disclosure.
Figure 10C:
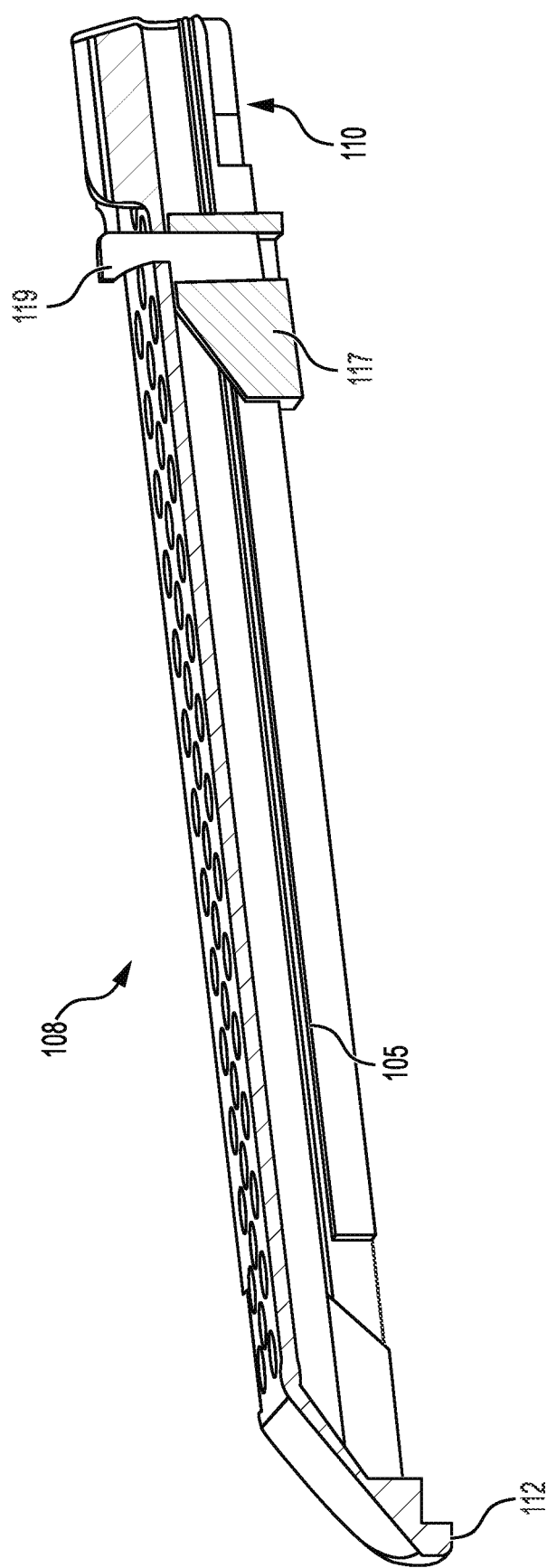
FIG. 10C shows a cross section of a portion of a replaceable end effector, according to aspects of the present disclosure.

FIG. 10A shows an exploded view of the end effector shown in FIG. 4B. FIG. 10B shows a cross section of a replaceable end effector 100. This view shows that both anvil jaw 102 and cartridge jaw 107 can include bearing surfaces 105 across which drive beam 308 can travel while pushing sled 117 and cutting edge 119. In the end effector shown in FIG. 10B, cutting edge 119 is disposed on the drive beam 308 and the sled 117. As discussed previously, cutting edge 119 can be disposed on drive beam 308 or on the sled 117. FIG. 10C shows a cross-section of a cartridge jaw 108 of a replaceable end effector 100 similar to that in FIG. 10B. In FIG. 10C, cutting edge 119 is a part of sled 117. The cutting edge 119 being a part of end effector 100 rather than closure and firing assembly 300 provides the advantage of a fresh, sharp cutting edge for each firing of the medical stapler 10. Alternatively, or additionally, the cutting edge 119 can be a separately manufactured component that is permanently attached to the sled 117.

Figure 11A:
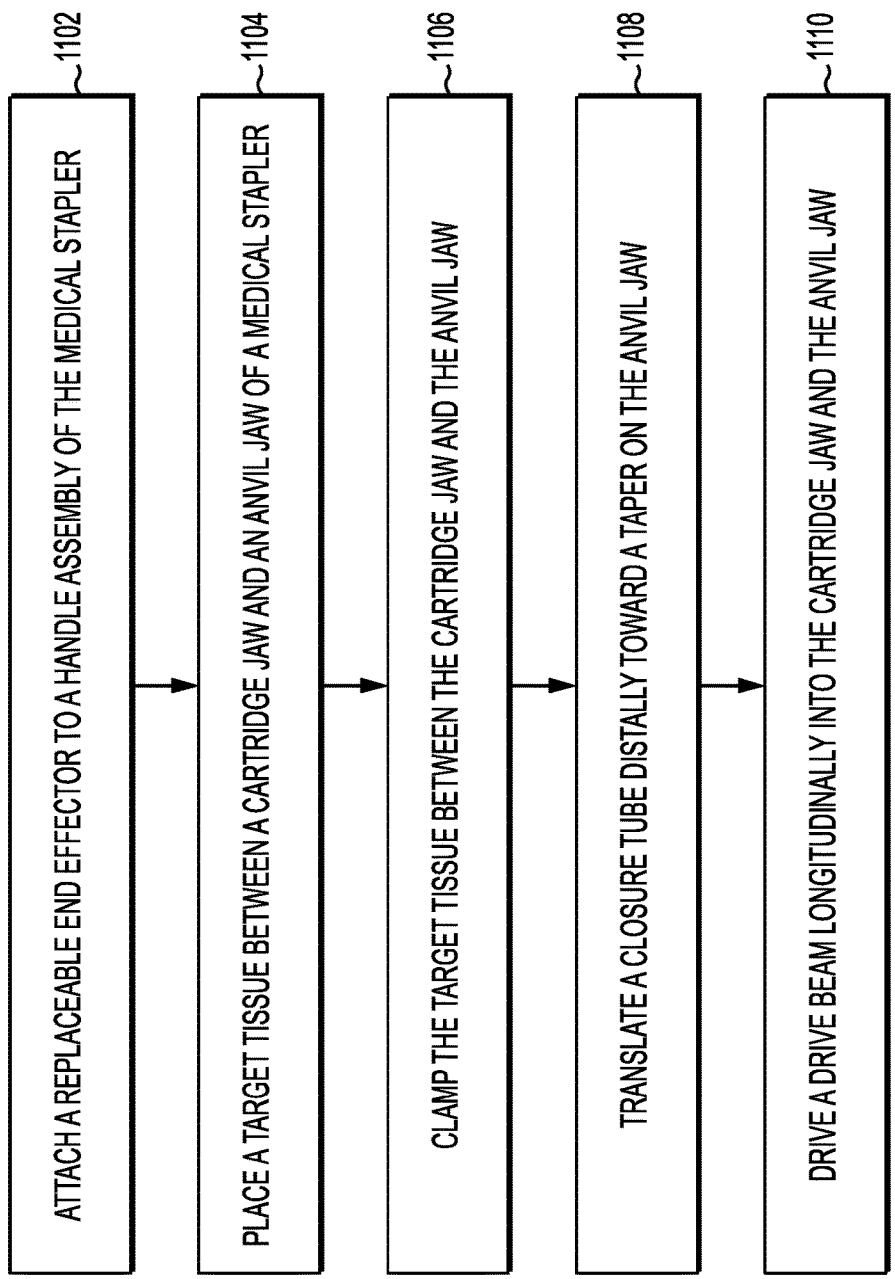
FIG. 11A provides a flowchart of a method of stapling tissue using a medical stapler, according to aspects of the present disclosure.

FIG. 11A shows a method 1000 of stapling tissue using a medical stapler. Method 1000 can in some examples be performed with the medical stapler 10 as detailed above, with all of its components, subcomponents, and features.

Method 1000 can include attaching 1102 a replaceable end effector to a handle assembly of the medical stapler, placing 1104 a target tissue between a cartridge jaw and an anvil jaw of a medical stapler, clamping 1106 the target tissue between the cartridge jaw and the anvil jaw, translating 1108 a closure tube distally toward a taper on the anvil jaw, and driving 1110 a drive beam longitudinally into the cartridge jaw and the anvil jaw.

Method 1000 can further include prior to attaching 1102 the replaceable end effector, translating 1101 the closure tube proximally, wherein translating 1101 the closure tube proximally permits attachment of the replaceable end effector to the medical stapler.

Figure 11B:
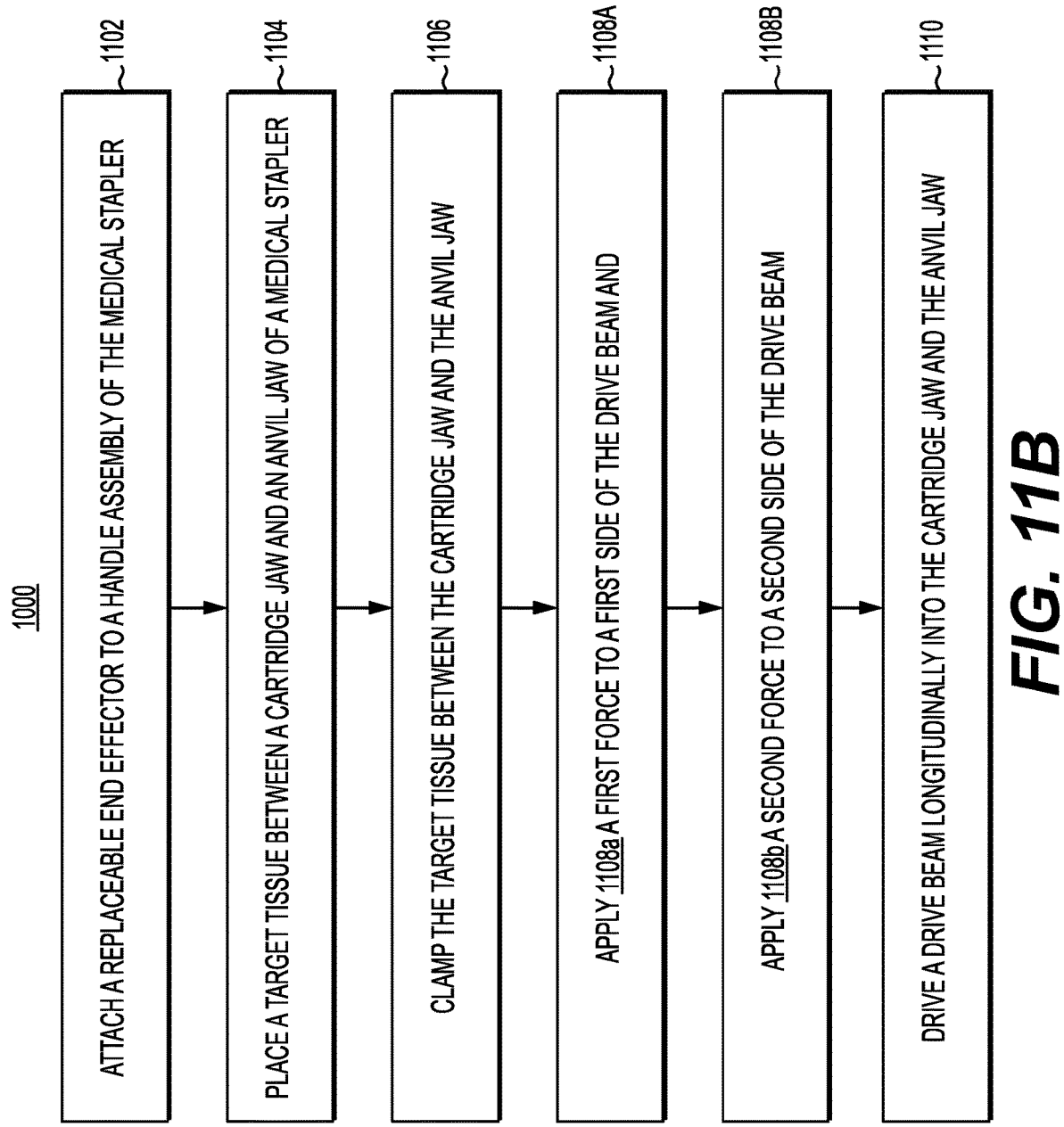
FIG. 11B provides a flowchart of a method of stapling tissue using a medical stapler, according to aspects of the present disclosure.

As shown in FIG. 11B, method 1000 can further include translating 1112 the closure tube proximally, wherein translating the closure tube proximally permits removal of the replaceable end effector from the medical stapler. The driving 1108 step for the drive beam can further include applying 1108A a first force to a first side of the drive beam and applying 1108B a second force to a second side of the drive beam. In some examples, the first force and the second force can be applied differentially by the flexible driveshafts 310, 312 discussed above in relation to FIG. 8A.

Method 1000 can further include removing 1114 the end effector from the medical stapler. Removing 1114 the replaceable end effector from the medical stapler step can further include moving 1115 the cartridge jaw and the anvil jaw longitudinally relative to a slanted face configured to drive the replaceable end effector upward relative to a longitudinal axis of the medical stapler.

The disclosed technology described herein can be further understood according to the following clauses:

Clause 1: A medical stapler (10) comprising: a replaceable end effector (100) comprising a releasable connector (111) formed at a proximal end (101) of the replaceable end effector (100); a closure and firing assembly (300) comprising: a reusable shaft (301) extending along a longitudinal axis (L-L) and comprising an articulation joint (13); and an engagement coupling (304) disposed distal to the articulation joint (13) and configured to releasably engage the releasable connector (111) of the replaceable end effector (100); and a cutting edge (119) integral with at least one of the replaceable end effector (100) or the closure and firing assembly (300).

Clause 2: The medical stapler (10) of clause 1, wherein the replaceable end effector (100) comprises: an anvil jaw (102) extending from a proximal portion (104) to a distal portion (106); a cartridge jaw (107) extending from a proximal portion (110) to a distal portion (112) and comprising: a bearing surface (105); a staple cartridge (108) disposed in the cartridge jaw (107) and comprising therein a plurality of staples (115) and a sled (117) configured to advance at least a portion of the plurality of staples (115) from the staple cartridge (108); and a slot (109) extending from the bearing surface (105) toward the staple cartridge (108); and a hinged connection (114) coupling the proximal portion (104) of the anvil jaw (102) to the proximal portion (110) of the cartridge jaw (107); wherein the closure and firing assembly (300) comprises a drive beam (308) configured to: translate, from outside of the slot (109), through the slot (109) and across the bearing surface (105) thus advancing the sled (117) from the proximal portion (110) to the distal portion (112); and retract from the slot (109) to remain with the closure and firing assembly (300) upon disengagement of the releasable connector (111) and the engagement coupling (304); and wherein the cutting edge (119) is configured to remain in the replaceable end effector (100) upon the disengagement of the releasable connector (111) and the engagement coupling (304).

Clause 3: The medical stapler (10) of clause 2, wherein the releasable connector (111) and the engagement coupling (304) form a tongue-and-groove engagement.

Clause 4: The medical stapler (10) of clause 2, wherein the releasable connector (111) comprises a folded coupling wing (111A) in the proximal portion (104) of the anvil jaw (102).

Clause 5: The medical stapler (10) of any of clauses 2-3, wherein the proximal portion (110) of the cartridge jaw (107) comprises a sloped surface (116) configured to engage with a drive beam (308).

Clause 6: The medical stapler (10) of any of clauses 1-5, wherein the releasable connector (111) further comprises a slanted face (113) configured to detach the replaceable end effector (100) from the reusable shaft (301) upon longitudinal translation of the replaceable end effector (100) relative to the reusable shaft (301).

Clause 7: The medical stapler (10) of any of clauses 1-6, wherein the sled (117) is configured to remain in the distal portion (106) of the anvil jaw (102) and the distal portion (112) of the cartridge jaw (107) to prevent hinging of the anvil jaw (102) relative to the cartridge jaw (107).

Clause 8: The medical stapler (10) of any of clauses 2-7, the closure and firing assembly further comprising: a closure tube (200) coaxial with the longitudinal axis (L-L), the closure tube (200) being movable longitudinally along the longitudinal axis (L-L) between a proximal position (200A) and a distal position (200B); in the proximal position (200A), the closure tube (200) encloses the hinged connection (114); and in the distal position (200B), the closure tube (200) applies a clamping force to the replaceable end effector (100).

Clause 9: The medical stapler (10) of clause 8, wherein the releasable connector (111) is further configured to be constrained by the closure tube (200) when the closure tube (200) is in the proximal position (200A).

Clause 10: The medical stapler (10) of any of clauses 8-9, wherein the proximal portion (110) of the cartridge jaw (107) comprises a sloped surface (116) configured to engage with the drive beam (308).

Clause 11: The medical stapler (10) of clause 10, wherein the sloped surface (116) is further configured to engage the closure tube (200) when the closure tube (200) is in the distal position (200B) enclosing the hinged connection (114).

Clause 12: The medical stapler (10) of any of clauses 7-10, wherein the proximal portion (104) of the anvil jaw (102) further comprises a taper (118) configured to engage the closure tube (200) in the distal position (200B).

Clause 13: The medical stapler (10) of any of clauses 7-10, the closure tube (200) being movable proximally past the proximal position (200A) to a removal position (200C) in which the closure tube (200) permits release of the replaceable end effector (100).

Clause 14: The medical stapler (10) of any of clauses 8-13, wherein the closure tube (200) in the distal position (200B) engages with the anvil jaw (102) proximate the proximal portion (104) pivoting the anvil jaw (102) toward the cartridge jaw (107).

Clause 15: The medical stapler (10) of any of clauses 1-14, the reusable shaft (301) further comprising: a first flexible driveshaft (310) coupled to the drive beam (308) at a first side (308A) of the drive beam (308); and a second flexible driveshaft (312) coupled to the drive beam (308) at a second side (308B) opposite the first side (308A), the first flexible driveshaft (310) and the second flexible driveshaft (312) configured to apply differential force to the drive beam (308).

Clause 16: The medical stapler (10) of clause 15, further comprising: at least one motor (402) configured to differentially drive the first flexible driveshaft (310) and the second flexible driveshaft (312); at least one sensor configured to detect a first force applied on the drive beam (308) by the first flexible driveshaft (310) and a second force applied on the drive beam (308) by the second flexible driveshaft (312); and processing circuitry configured to modulate the forces to be applied on the drive beam (308) by the first flexible driveshaft (310) and the second flexible driveshaft (312) using the forces detected by the at least one sensor as inputs.

Clause 17: A medical stapler comprising: a replaceable end effector comprising: an anvil jaw extending from a proximal portion to a distal portion; a cartridge jaw extending from a proximal portion to a distal portion and comprising: a bearing surface; a staple cartridge disposed in the cartridge jaw and comprising therein: a plurality of staples; a sled configured to advance at least a portion of the plurality of staples from the staple cartridge; and a cutting edge; a slot extending from the bearing surface toward the staple cartridge; a hinged connection coupling the proximal portion of the anvil jaw to the proximal portion of the cartridge jaw; and a releasable connector formed at a proximal end of the replaceable end effector; and a closure and firing assembly comprising: a reusable shaft extending along a longitudinal axis and configured to couple to the releasable connector; an engagement coupling configured to releasably engage the releasable connector of the replaceable end effector; and a drive beam configured to: translate, from outside of the slot, through the slot and across the bearing surface thus advancing the sled from the proximal portion to the distal portion, and retract from the slot to remain with the closure and firing assembly upon disengagement of the releasable connector and the engagement coupling, wherein the cutting edge is configured to remain in the replaceable end effector upon the disengagement of the releasable connector and the engagement coupling.

Clause 18: The medical stapler of clause 17, wherein the releasable connector and the engagement coupling form a tongue-and-groove engagement.

Clause 19: The medical stapler of clause 17, wherein the releasable connector comprises a folded coupling wing in the proximal portion of the anvil jaw.

Clause 20: The medical stapler of any of clauses 17-19, wherein the proximal portion of the cartridge jaw comprises a sloped surface configured to engage with a drive beam disposed in the medical stapler handle assembly.

Clause 21: The medical stapler of any of clauses 17-20, wherein the releasable connector further comprises a slanted face configured to detach the replaceable end effector from the reusable shaft upon longitudinal translation of the replaceable end effector relative to the medical stapler handle assembly.

Clause 22: The medical stapler of any of clauses 17-21, wherein the sled is configured to remain in the distal portion of the anvil jaw and the distal portion of the cartridge jaw to prevent hinging of the anvil jaw relative to the cartridge jaw.

Clause 23: The medical stapler of any of clauses 17-22, further comprising: a closure tube coaxial with the longitudinal axis, the closure tube being movable longitudinally along the longitudinal axis between a proximal position and a distal position; in the proximal position, the closure tube encloses the hinged connection; and in the distal position, the closure tube applies a clamping force to the replaceable end effector.

Clause 24: The medical stapler of clause 23, wherein the releasable connector is further configured to be constrained by the closure tube when the closure tube is in the proximal position.

Clause 25: The medical stapler of any of clauses 23-24, wherein the proximal portion of the cartridge jaw comprises a sloped surface configured to engage with the drive beam.

Clause 26: The medical stapler of clause 25, wherein the sloped surface is further configured to engage the closure tube when the closure tube is in the distal position enclosing the hinged connection.

Clause 27: The medical stapler of any of clauses 23-26, wherein the proximal portion of the anvil jaw further comprises a taper configured to engage the closure tube in the distal position.

Clause 28: The medical stapler of any of clauses 23-26, the closure tube being movable proximally past the proximal position to a removal position in which the closure tube permits release of the replaceable end effector.

Clause 29: The medical stapler of any of clauses 23-28, wherein the closure tube in the distal position engages with the anvil jaw proximate the proximal portion pivoting the anvil jaw toward the cartridge jaw.

Clause 30: The medical stapler of any of clauses 17-29, the reusable shaft further comprising: a first flexible driveshaft coupled to the drive beam at a first side of the drive beam; and a second flexible driveshaft coupled to the drive beam at a second side opposite the first side, the first flexible driveshaft and the second flexible driveshaft configured to apply differential force to the drive beam.

Clause 31: The medical stapler of clause 30, further comprising: at least one motor configured to differentially drive the first flexible driveshaft and the second flexible driveshaft; at least one sensor configured to detect a first force applied on the drive beam by the first flexible driveshaft and a second force applied on the drive beam by the second flexible driveshaft; and processing circuitry configured to modulate the forces to be applied on the drive beam by the first flexible driveshaft and the second flexible driveshaft using the forces detected by the at least one sensor as inputs.

Clause 32: A replaceable end effector comprising: an anvil jaw extending from a proximal portion to a distal portion; a cartridge jaw extending from a proximal portion to a distal portion and comprising: a bearing surface; a staple cartridge, permanently disposed in the cartridge jaw and comprising therein: a plurality of staples; and a sled comprising: a wedge disposed on a distal end of the sled and configured to advance at least a portion of the plurality of staples from the staple cartridge; and a cutting edge; and a slot extending from the bearing surface toward the staple cartridge and having a proximal opening; a hinged connection coupling the proximal portion of the anvil jaw to the proximal portion of the cartridge jaw; and a releasable connector formed at a proximal end of the replaceable end effector and configured to couple the replaceable end effector to a reusable shaft of a medical stapler handle assembly.

Clause 33: The replaceable end effector of clause 32, wherein the releasable connector comprises a coupling slot in the proximal portion of the anvil jaw.

Clause 34: The replaceable end effector of clause 33, wherein the anvil jaw comprises a release tab configured to apply a spring force to detach the end effector.

Clause 35: The replaceable end effector of any of clauses 32-33, wherein the proximal portion of the cartridge jaw comprises a sloped surface configured to engage with a drive beam disposed in the medical stapler handle assembly.

Clause 36: The replaceable end effector of any of clauses 32-35, wherein the cartridge jaw further comprises a cover disposed parallel to the bearing surface and forming a top surface of the slot.

Clause 37: The replaceable end effector of clause 36, the cover being recessed into the cartridge jaw.

Clause 38: The replaceable end effector of any of clauses 32-37, wherein the proximal portion of the anvil jaw further comprises a taper.

Clause 39: The replaceable end effector of any of clauses 32-38, wherein the releasable connector further comprises a slanted face configured to detach the replaceable end effector from the reusable shaft upon longitudinal translation of the replaceable end effector relative to the medical stapler handle assembly.

Clause 40: The replaceable end effector of any of clauses 32-38, wherein the sled is configured to remain in the distal portion of the anvil jaw and the distal portion of the cartridge jaw to prevent hinging of the anvil jaw relative to the cartridge jaw.

Clause 41: A method of stapling tissue using a medical stapler, the method comprising the steps of: attaching a replaceable end effector to a handle assembly of the medical stapler; placing a target tissue between a cartridge jaw and an anvil jaw of a medical stapler; clamping the target tissue between the cartridge jaw and the anvil jaw; translating a closure tube distally toward a taper on the anvil jaw; and driving a drive beam longitudinally into the cartridge jaw and the anvil jaw.

Clause 42: The method of clause 41, further comprising, prior to attaching the replaceable end effector, translating the closure tube proximally, wherein translating the closure tube proximally permits attachment of the replaceable end effector to the medical stapler.

Clause 43: The method of clause 41, further comprising the step of: translating the closure tube proximally, wherein translating the closure tube proximally permits removal of the replaceable end effector from the medical stapler.

Clause 44: The method of any of clauses 41-43, wherein the driving the drive beam step further comprises:

applying a first force to a first side of the drive beam; and applying a second force to a second side of the drive beam.

Clause 45: The method of any of clauses 41-44, further comprising the step of: removing the end effector from the medical stapler.

Clause 46: The method of clause 45, wherein the removing the replaceable end effector from the medical stapler step further comprises: moving the cartridge jaw and the anvil jaw longitudinally relative to a slanted face configured to drive the replaceable end effector upward relative to a longitudinal axis of the medical stapler.

Clause 47: A reusable handle for a medical stapler, the handle comprising: a reusable shaft extending along a longitudinal axis from a proximal end to a distal end and configured to couple to a replaceable end effector; a handle assembly permanently coupled to the proximal end of the reusable shaft; and an engagement coupling configured to releasably engage the replaceable end effector; and a drive beam configured to advance into and retract out of the replaceable end effector.

Clause 48: The reusable handle of clause 47, further comprising: a closure tube coaxial with the longitudinal axis, the closure tube being movable longitudinally along the axis between a proximal position, a distal position, and a removal position, in the proximal position, the closure tube encloses the distal end of the reusable shaft, in the distal position, the closure tube extends past the distal end of the reusable shaft, and in a removal position, the closure tube does not enclose the distal end of the reusable shaft.

Clause 49: The reusable handle of clause 48, further comprising a first flexible driveshaft coupled to the drive beam.

Clause 50: The reusable handle of clause 49, the first flexible driveshaft coupled to the drive beam at a first side of the drive beam, and the reusable shaft further comprising: a second flexible driveshaft coupled to the drive beam at a second side opposite the first side, the first flexible driveshaft and the second flexible driveshaft configured to apply differential force to the drive beam.

Clause 51: The reusable handle of clause 50, further comprising: at least one motor disposed in the handle assembly configured to differentially drive the first flexible driveshaft and the second flexible driveshaft; at least one sensor configured to detect a first force applied on the drive beam by the first flexible driveshaft and a second force applied on the drive beam by the second flexible driveshaft; and processing circuitry configured to modulate the forces to be applied on the drive beam by the first flexible driveshaft and the second flexible driveshaft using the forces detected by the at least one sensor as inputs.

The embodiments described above are cited by way of example, and the present invention is not limited by what has been particularly shown and described hereinabove. Rather, the scope of the invention includes both combinations and sub combinations of the various features described and illustrated hereinabove, as well as variations and modifications thereof which would occur to persons skilled in the art upon reading the foregoing description and which are not disclosed in the prior art.

The invention claimed is:

1. A medical stapler comprising:
a replaceable end effector comprising:
a releasable connector formed at a proximal end of the replaceable end effector;
an anvil jaw extending from a proximal portion to a distal portion;
a cartridge jaw extending from a proximal portion to a distal portion and comprising:
a bearing surface;
a staple cartridge disposed in the cartridge jaw and comprising therein a plurality of staples and a sled configured to advance at least a portion of the plurality of staples from the staple cartridge; and
a slot extending from the bearing surface toward the staple cartridge; and
a hinged connection coupling the proximal portion of the anvil jaw to the proximal portion of the cartridge jaw;
a closure and firing assembly comprising:
a reusable shaft extending along a longitudinal axis and comprising an articulation joint; and
an engagement coupling disposed distal to the articulation joint and configured to releasably engage the releasable connector of the replaceable end effector;
a drive beam configured to:
translate, from outside of the slot, through the slot and across the bearing surface thus advancing the sled from the proximal portion to the distal portion; and
retract from the slot to remain with the closure and firing assembly upon disengagement of the releasable connector and the engagement coupling; and
a cutting edge integral with at least one of the replaceable end effector or the closure and firing assembly, wherein the cutting edge is configured to remain in the replaceable end effector upon the disengagement of the releasable connector and the engagement coupling.

2. The medical stapler of claim 1, wherein the releasable connector and the engagement coupling form a tongue-and-groove engagement.

3. The medical stapler of claim 2, wherein the proximal portion of the cartridge jaw comprises a sloped surface configured to engage with a drive beam.

4. The medical stapler of claim 3, wherein the releasable connector further comprises a slanted face configured to detach the replaceable end effector from the reusable shaft upon longitudinal translation of the replaceable end effector relative to the reusable shaft.

5. The medical stapler of claim 4, wherein the sled is configured to remain in the distal portion of the anvil jaw and the distal portion of the cartridge jaw to prevent hinging of the anvil jaw relative to the cartridge jaw.

6. The medical stapler of claim 5, the closure and firing assembly further comprising:
a closure tube coaxial with the longitudinal axis, the closure tube being movable longitudinally along the longitudinal axis between a proximal position and a distal position;
in the proximal position, the closure tube encloses the hinged connection; and
in the distal position, the closure tube applies a clamping force to the replaceable end effector.

7. The medical stapler of claim 6, wherein the releasable connector is further configured to be constrained by the closure tube when the closure tube is in the proximal position.

8. The medical stapler of claim 7, wherein the proximal portion of the cartridge jaw comprises a sloped surface configured to engage with the drive beam.

9. The medical stapler of claim 8, wherein the sloped surface is further configured to engage the closure tube when the closure tube is in the distal position enclosing the hinged connection.

10. The medical stapler of claim 8, wherein the proximal portion of the anvil jaw further comprises a taper configured to engage the closure tube in the distal position.

11. The medical stapler of claim 8, the closure tube being movable proximally past the proximal position to a removal position in which the closure tube permits release of the replaceable end effector.

12. The medical stapler of claim 11, wherein the closure tube in the distal position engages with the anvil jaw proximate the proximal portion pivoting the anvil jaw toward the cartridge jaw.

13. The medical stapler claim 12, the reusable shaft further comprising:
a first flexible driveshaft coupled to the drive beam at a first side of the drive beam; and
a second flexible driveshaft coupled to the drive beam at a second side opposite the first side, the first flexible driveshaft and the second flexible driveshaft configured to apply differential force to the drive beam.

14. The medical stapler of claim 13, further comprising: at least one motor configured to differentially drive the first flexible driveshaft and the second flexible driveshaft; at least one sensor configured to detect a first force applied on the drive beam by the first flexible driveshaft and a second force applied on the drive beam by the second flexible driveshaft; and processing circuitry configured to modulate the forces to be applied on the drive beam by the first flexible driveshaft and the second flexible driveshaft using the forces detected by the at least one sensor as inputs.

15. The medical stapler of claim 1, wherein the releasable connector comprises a folded coupling wing in the proximal portion of the anvil jaw.

16. A replaceable end effector comprising: an anvil jaw extending from a proximal portion to a distal portion; a cartridge jaw extending from a proximal portion to a distal portion and comprising: a bearing surface; a staple cartridge, permanently disposed in the cartridge jaw and comprising therein: a plurality of staples; and a sled comprising: a wedge disposed on a distal end of the sled and configured to advance at least a portion of the plurality of staples from the staple cartridge; and a cutting edge; and a slot extending from the bearing surface toward the staple cartridge and having a proximal opening; a hinged connection coupling the proximal portion of the anvil jaw to the proximal portion of the cartridge jaw; and a releasable connector formed at a proximal end of the replaceable end effector and configured to couple the replaceable end effector to a reusable shaft of a medical stapler handle assembly, the releasable connector comprising a coupling slot in the proximal portion of the anvil jaw.

17. The replaceable end effector of claim 16, wherein the anvil jaw comprises a release tab configured to apply a spring force to detach the end effector.

18. The replaceable end effector of any of claim 17, wherein the proximal portion of the cartridge jaw comprises a sloped surface configured to engage with a drive beam disposed in the medical stapler handle assembly.

19. A replaceable end effector comprising:
an anvil jaw extending from a proximal portion to a distal portion;
a cartridge jaw extending from a proximal portion to a distal portion;
a hinged connection coupling the proximal portion of the anvil jaw to the proximal portion of the cartridge jaw; and
a releasable connector formed at a proximal end of the replaceable end effector, the releasable connector comprising a tongue connector configured to engage with a groove on a distal end of a reusable shaft, engagement of the tongue connector and the groove releasably coupling the replaceable end effector to the reusable shaft.

20. The replaceable end effector of claim 19, wherein the cartridge jaw comprises a sled, the sled comprising (i) a wedge configured to advance a plurality of staples and (ii) a cutting edge,
wherein the cutting edge is configured to remain in the replaceable end effector upon disengagement of the releasable connector from the reusable shaft.

* * * * *